United States Patent
Otose

(10) Patent No.: US 9,709,813 B2
(45) Date of Patent: Jul. 18, 2017

(54) IMAGE DISPLAY DEVICE

(71) Applicant: NLT TECHNOLOGIES, LTD., Kawasaki, Kanagawa (JP)

(72) Inventor: Tomohiko Otose, Kawasaki (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 232 days.

(21) Appl. No.: 13/849,297

(22) Filed: Mar. 22, 2013

(65) Prior Publication Data
US 2013/0250409 A1  Sep. 26, 2013

(30) Foreign Application Priority Data
Mar. 23, 2012  (JP) .................................. 2012-066733

(51) Int. Cl.
| G02F 1/13 | (2006.01) |
| G02B 27/22 | (2006.01) |
| H04N 13/04 | (2006.01) |
| G02F 1/1335 | (2006.01) |
| G02F 1/1362 | (2006.01) |

(Continued)

(52) U.S. Cl.
CPC .... *G02B 27/2214* (2013.01); *G02F 1/133512* (2013.01); *G02F 1/133526* (2013.01); *G02F 1/136209* (2013.01); *G02F 2001/133354* (2013.01); *G02F 2001/134345* (2013.01); *G02F 2201/123* (2013.01); *G02F 2201/40* (2013.01);

(Continued)

(58) Field of Classification Search
CPC ................ G02B 27/22; G02B 27/2214; G02F 1/133512

USPC .................................. 359/462–477, 619–628
See application file for complete search history.

(56) References Cited

U.S. PATENT DOCUMENTS

6,151,062 A * 11/2000 Inoguchi et al. ................ 348/51
8,654,267 B2 * 2/2014 Fujioka ................ G06F 3/0412
349/12

(Continued)

FOREIGN PATENT DOCUMENTS

| JP | 06-332354 A | 12/1994 |
| JP | 8136931 A | 5/1996 |

(Continued)

OTHER PUBLICATIONS

Communication dated Oct. 27, 2015, from the Japanese Patent Office in counterpart application No. 2012-066733.

*Primary Examiner* — Scott J Sugarman
*Assistant Examiner* — Kristina Deherrera
(74) *Attorney, Agent, or Firm* — Sughrue Mion, PLLC

(57) ABSTRACT

An image display device includes a first substrate on which first aperture areas are formed, a second substrate on which second aperture areas are formed, an optical element, a plurality of unit pixels each including a first-viewpoint pixel for displaying an image for a first viewpoint and a second-viewpoint pixel for displaying an image for a second viewpoint, an optical path distribution unit, and a plurality of light-shielding areas including edge sections facing each other in a first direction, one of the edge sections being defined by one of the first aperture areas, the other of the edge sections being defined by one of the second aperture areas, and the one of the edge sections and the other of the edge sections being parallel, under a condition that the first substrate and the second substrate are joined together with positions thereof in the first direction being aligned.

3 Claims, 35 Drawing Sheets

(51) Int. Cl.
 *G02F 1/1333* (2006.01)
 *G02F 1/1343* (2006.01)

(52) U.S. Cl.
 CPC ..... *H04N 13/0404* (2013.01); *H04N 13/0409* (2013.01)

(56) References Cited

U.S. PATENT DOCUMENTS

| | | | |
|---|---|---|---|
| 2008/0186572 A1* | 8/2008 | Tomikawa et al. | 359/462 |
| 2011/0043541 A1* | 2/2011 | Cok | G09G 3/006 345/690 |
| 2011/0304601 A1* | 12/2011 | Niioka | G02B 27/2214 345/209 |

FOREIGN PATENT DOCUMENTS

| | | |
|---|---|---|
| JP | 4089843 B2 | 5/2008 |
| JP | 2009-098311 A | 5/2009 |
| JP | 201218382 A | 1/2012 |

\* cited by examiner ssIMAGE DISPLAY DEVICE

CROSS REFERENCE TO RELATED APPLICATIONS

This application is based on Japanese Patent Application No. 2012-066733 filed on Mar. 23, 2012, in the Japan Patent Office, the entire content of which is hereby incorporated by reference.

TECHNICAL FIELD

The present invention relates to an image display device, and especially relates to an image display device by which users can perceive stereoscopic images.

BACKGROUND

Conventionally, image display devices each displaying different images for plural viewpoints to enable a viewer to perceive a stereoscopic image have been studied. This technology provides different images causing parallax for viewer's left and right eyes, and thereby realizes a stereoscopic image display device. Various methods to display stereoscopic images have ever been studied in order to achieve such the function concretely. Those methods can be classified broadly into methods to use eyeglasses and methods not to use eyeglasses. While the methods to use eyeglasses include an anaglyph method which uses different colors and a method to use polarization eyeglasses which uses polarization, those methods hardly avoid a bother in wearing eyeglasses essentially. Therefore, glassless methods wherein eyeglasses are not used have been studied briskly in recent years. The glassless methods include a parallax barrier method and a lenticular lens method.

First, a parallax barrier method will be described. FIG. 26 shows an optical model diagram illustrating a method of displaying stereoscopic images according to a parallax barrier method. As shown in FIG. 26, parallax barrier 105 is a barrier (a light-shielding plate) wherein plural aperture areas in a vertically-pinstriped shape, in other words, slits 105a are formed thereon. Display panel 102 is arranged in the vicinity of one surface of parallax barrier 105. In display panel 102, there are arranged pixels for a right eye 123 and pixels for a left eye 124 along a direction perpendicular to the elongated direction of slits 105a. There is arranged light source 108 in the vicinity of the other surface of parallax barrier 105, in other words, opposite from display panel 102.

Light emitted from light source 108 is partially shielded by parallax barrier 105. On the other hand, as for light which has passed through slits 105a without being shielded by parallax barrier 105, a part of the light passes thorough a pixel for a right eye 123 to become light flux 181 and another part of the light passes thorough a pixel for a left eye 124 to become light flux 182. In this situation, a viewer's position where the viewer can perceive a stereoscopic image is defined by a positional relationship between parallax barrier 105 and the pixels. That is, it is required that right eye 141 of viewer 104 is located in an area where all the light fluxes 181 corresponding to plural pixels for right eye 123 pass through and left eye 142 of viewer 104 is located in an area where all the light fluxes 182 pass through. This corresponds to the situation that middle point 143 of the positions of right eye 141 and left eye 142 of the viewer is located in the stereoscopic perceptive range 107 shown as the tetragon in FIG. 26.

Among line segments extending in the arrangement direction of pixels for a right eye 123 and pixels for a left eye 124 in the stereoscopic perceptive range 107, a line segment passing intersection 107a of diagonal lines of stereoscopic perspective range 107 is the longest. Therefore, a tolerance for the displacement of a viewer in the left and right directions becomes the maximum under the condition that middle point 143 is located at intersection 107a, and such the condition is the most preferable as a viewing point. Accordingly, in the stereoscopic image display method, it is recommended that viewers perform viewing at best viewing distance OD, assuming the distance between intersection 107a and display panel 102 as the best viewing distance OD. Herein, a virtual plane on which a distance from display panel 102 keeps best viewing distance OD in the stereoscopic perceptive region 107 is defined as best viewing surface 107h. This structure allows light from pixels for a right eye 123 and light from pixels for a left eye 124 reach right eye 141 and left eye 142 of a viewer, respectively, which enables the viewer to perceive an image displayed on display panel 102 as a stereoscopic image.

At the beginning of devising the above-described parallax barrier method, a parallax barrier was arranged at a position between the pixels and the eyes, which caused a problem that the parallax barrier obstructed the view and provided low visibility. However, the recent realization of liquid crystal displays allowed parallax barrier 105 to be arranged behind display panel 102 as shown in FIG. 26, which solved the problem of visibility. Therefore, stereoscopic image display devices using the parallax barrier method are currently studied briskly and stereoscopic image display devices to which the parallax barrier method is applied are actually in the market as products.

Next, a lenticular lens method will be described. FIG. 27 is a perspective view illustrating a lenticular lens. FIG. 28 is an optical model diagram illustrating a method of displaying stereoscopic images by using the lenticular lens method. FIG. 29 is a perspective view illustrating a stereoscopic display device. As shown in FIG. 27, lenticular lens 121 has a flat plane on one surface, and plural projecting sections each having a semi-cylindrical shape (cylindrical lenses 122) formed on the other surface, where the plural projecting sections extend in one direction and are arranged with their elongated direction being parallel with each other.

As shown in FIGS. 28 and 29, a stereoscopic image display device using the lenticular lens method includes lenticular lens 121, display panel 102 and light source 108 arranged in order from a viewer, and pixels of display panel 102 are placed on a focus plane of lenticular lens 121. On display panel 102, pixels 123 for right eye 141 and pixels 142 for left eye 142 are arrayed one after the other. Under the situation, groups each composed of neighboring pixels 123 and 124 correspond to cylindrical lenses (projection sections) 122 of lenticular lens 121, respectively. This structure makes cylindrical lenses (projection sections) 122 of lenticular lens 121 separate light which has been emitted from light source 108 and passed through respective pixels in directions toward the right and left eyes by and makes the left and right eyes perceive different images, which enables the viewer to perceive a stereoscopic image.

In construct to the above-described parallax barrier method which is a method to "block" unwanted light by using a barrier, the lenticular lens method is a method to change the way light travels, and does not theoretically cause a deterioration of brightness of the display panel coming from arrangement of a lenticular lens. Therefore, this method is regarded as very likely to be applied to mobile devices wherein bright display and low power consumption are valued especially.

The stereoscopic image display device has five viewpoints in the horizontal direction. A viewer can observe five different images on the device by changing the viewing angle in the horizontal direction.

As an example of an image display device which can display different images for plural viewpoints, a display for simultaneously displaying multiple images has been disclosed in Japanese Published Unexamined Patent Application (JP-A) No. H06-332354. The display disclosed in JP-A No. H06-332354 simultaneously displays different planer images in the same condition in each of the viewing directions by utilizing an image distributing function coming from a lenticular lens, whereby making it possible for a plural different viewers to simultaneously observe, on a single display, different planer images from different directions, respectively.

In order to achieve the above-described image display device, liquid crystal display devices are generally used in most cases. Herein, there is cited a structural example of a general liquid crystal display device disclosed in Japanese Examined Patent application (JP-B) No. 4089843. FIG. 30A is a sectional view showing a sectional structure disclosed in JP-B No. 4089843. Each of FIGS. 30B and 30C is a sectional view showing an example of a sectional structure which is assumed based on the structure of FIG. 30A.

FIG. 30A shows a structure that transparent substrate (at the side of TFT (Thin Film Transistor)) 202 and transparent substrate (at the side of a common electrode) 203 are arranged to face each other. On transparent substrate (at the side of TFT) 202, there are formed gate insulator 208, drain lines (signal lines) 207, organic insulator 213 and pixel electrodes 205. On transparent substrate (at the side of the common electrode) 203, there are formed color filters r, g, and b, black matrix 211 and common electrode 210. While drain lines 207 and black matrix 211 are almost the same in width in this structure, there can be considered the structure that drain lines 207 are larger than black matrix 211 in width as shown in FIG. 30B. Alternatively, there can be considered the structure that black matrix 211 is larger than drain line 207 in width as shown in FIG. 30C.

Next, there is cited JP-A No. 2009-98311 as a known art providing display of stereoscopic view with enhanced image quality. FIG. 31A shows a sectional view illustrating a sectional structure of JP-A No. 2009-98311. FIG. 31B shows a plan view showing a pixel structure of JP-A No. 2009-98311.

As shown in FIG. 31A, the sectional structure of a display device of JP-A No. 2009-98311 has a structure that lenticular lens 303 is arranged on display panel 302 and display panel 302 is formed by layering TFT substrate 302a and counter substrate 302b with liquid crystal 305 put between them.

As shown in FIG. 31B, one of features of pixels of JP-A No. 2009-98311 is that data line D (equivalent to drain line (signal line) 7 of JP-B No. 4089843) are inclined at angle with the Y-axis. Under the condition that there is a structural element, such as lenticular lens 303, having a function to distribute optical paths of light emitted from display panel 302, a viewer observes brightness of various parts of an aperture area of a pixel along the X-axis direction on the sheet of FIG. 31B. If a part of the aperture area of a pixel has a brightness which is significantly different from the other parts, the viewer perceives the difference in brightness, which means that the viewer observes a deteriorated view. However, as for a pixel shown in FIG. 31B, the viewer does not perceive the difference in brightness even when moving the viewpoint along the X axis, under the condition that the relationship h=h1+h2 holds, where h represents length of a part where light passes through out of line B-B running in the Y-axis direction and h1 and h2 represent lengths of parts where light passes through out of line A-A running in the Y-axis direction. Thereby, the viewer can view an image stereoscopically displayed in an excellent display condition.

However, the above conventional arts have problems which will be described below.

Problems which can be caused when the structures of the conventional arts are applied to a stereoscopic image display device will be described, with reference to FIGS. 32A to 32C. The upper parts of FIGS. 32A to 32C are plan views each showing the condition that black matrix 211 and drain line 207 are overlapped with each other between neighboring pixels, viewed from the normal direction of the transparent substrates. The lower parts of FIGS. 32A to 32C are diagrams each showing brightness (light amount) at respective positions on pixels. Transparent substrate (at the side of TFT) 202 and transparent substrate (at the common electrode) 203 are joined together with an unillustrated spacer being arranged between them. In this situation, they can be joined together with displacement depending on accuracy of a machine.

Referring with FIG. 32A, there will be described the situation that, when drain line 207 and black matrix 211 both working as a light-shielding member are almost the same in width, the displacement between the joined transparent substrates has been caused. In this situation, it is assumed that transparent substrate (at the side of the counter electrode) 203 has shifted to the right-hand side in the FIG. 32A under the condition that the position of transparent substrate (at the side of TFT) 202 has been fixed. Symbols h and h1 through h3 represent heights at respective positions of aperture areas (which will be called as aperture-area heights hereinafter). Symbols $Wb1$ and $Wb2$ represent the sizes of widths of light-shielding sections which are located between pixels and are areas where light does not pass through (which will be called as light-shielding widths). Symbols $d1$ and $d2$ represent direction components of $Wb1$ and $Wb2$ measured in the height direction of the aperture areas and are defined by the following expressions, where θ is the angle of the light-shielding section.

$d1 = Wb1/\sin θ$ $d2 = Wb2/\sin θ$

In the situation that there is no displacement (the left part of FIG. 32A), the relationship of the aperture-area heights h=h1+h2 holds. Therefore, in the graph with position on pixels as the horizontal axis and brightness as the vertical axis, the brightness keeps the almost constant value L. On the other hand, in the situation that there is the displacement (the right part of FIG. 32A), the edge part of drain line 207 is exposed because of the displacement of black matrix 211 in the right, which enlarges the light-shielding width from $Wb1$ to $Wb2$ (>$Wb1$). This situation also enlarges the height-direction component $d1$ to $d2$ (>$d1$). In contrast, aperture-area height h2 is decreased to h3 (<h2) because the displacement enlarges height-direction component $d1$ to $d2$. Therefore, assuming the reduction of brightness depending on the decrease of the aperture-area heights as reduction amount 1, the vicinity of the light-shielding member becomes dark by the reduction amount 1. In other words, when the displacement between the joined transparent substrates has been caused in the structure of FIG. 32A, a part with poor brightness appears at a certain position on a pixel, which deteriorates quality of images.

Referring with FIG. 32B, there will be described the situation that the displacement between the joined transparent substrate has been caused, in the structure that black matrix 211 is larger than drain line 207 in width. Similarly to FIG. 32A, it is assumed that the transparent substrate (at the side of the counter electrode) 203 has shifted to the right-hand side under the condition that the position of transparent substrate (at the side of the TFT) 202 is fixed. Symbols h, h1 and h2 represent aperture-area heights. Symbols Wb represents the light-shielding width. Symbol d represents a direction component of Wb measured in the height direction of the aperture areas and is defined by the following expression, where θ is the angle of the light-shielding section.

$$d=Wb/\sin\theta$$

In the situation that there is no displacement (the left part of FIG. 32B), the relationship of the aperture-area heights h=h1+h2 holds. Therefore, in the graph with position on pixels as the horizontal axis and brightness as the vertical axis, the brightness keeps the almost constant value L. On the other hand, in the situation that there is the displacement (the right part of FIG. 32B), though black matrix 211 is displaced in the right direction, drain line 207 is hidden behind black matrix 211 with avoiding the situation that drain line 207 is exposed as shown in FIG. 32A because drain line 207 is thinner than black matrix 211. Therefore, light-shielding width Wb does not change. Accordingly, the value of d also does not change, which avoids that the relationship h=h1+h2 breaks down because of the displacement between the joined transparent substrate. Therefore, even when the displacement between the joined transparent substrates has been caused, it does not deteriorate image quality.

However, the structure shown in FIG. 32B requires making black matrix 211 larger than drain line 207 in width, which makes the light-shielding width wider. Hereinafter, a problem which can be caused when the light-shielding width becomes wide will be described with reference to FIG. 33. It is assumed that the light-shielding width enlarged from Wb1 to Wb2 (Wb1<Wb2) as shown in FIG. 33. In order to make the aperture-area heights of the pixels at the left-hand side and the right-hand side equal to each other, the displacement amount between neighboring pixels in the Y-axis direction is required to increase from e1 to e2 (e1<e2). In other words, when the light-shielding width becomes larger with keeping the same resolution (which corresponds to the case that the distance between pixels is kept to be constant), the aperture-area height decreases from h1 to h2 (h1>h2), which causes another problem that the aperture areas become small.

Referring with FIG. 32C, there will be described the situation that the displacement between the joined transparent substrate has been caused, in the structure that drain line 207 is larger than black matrix 211 in width. Similarly to FIG. 32A, it is assumed that transparent substrate (at the side of the counter electrode) 203 has shifted to the right-hand side under the condition that the position of transparent substrate (at the side of the TFT) 202 is fixed. Symbols h, h1 and h2 represent aperture-area heights. Symbols Wb represents the light-shielding width. Symbol d represents a direction component of Wb measured in the height direction of the aperture areas and is given by the following expressions, where θ is the angle of the light-shielding section.

$$d=Wb/\sin\theta$$

In the situation that there is no displacement (the left part of FIG. 32C), the relationship of the aperture-area heights h=h1+h2 holds. Therefore, in the graph with position on pixels as the horizontal axis and brightness as the vertical axis, the brightness keeps the almost constant value L. On the other hand, in the situation that there is the displacement (the right part of FIG. 32C), though black matrix 211 is displaced in the right direction, light-shielding width Wb is defined by drain line 207 regardless of the position of black matrix 211 because black matrix 211 is thinner than drain line 207. Accordingly, the value of d also does not change, which avoids that the relationship h=h1+h2 breaks down because of the displacement between the joined transparent substrate. Therefore, even when the displacement between the joined transparent substrates has been caused, it does not deteriorate image quality.

However, the structure shown in FIG. 32C requires making drain line 207 larger than black matrix 211 in width, which makes the light-shielding width wider. Similarly to the case of FIG. 32B, it causes the problem that the aperture areas become small.

While the above has described situation that drain line 207 and black matrix 211 form a light-shielding section, the above-described problems can also be caused under the situation that a light-shielding section is composed of arbitrary light-shielding members formed on the two transparent substrates.

Accordingly, when a general liquid crystal display device is applied to a display device capable of displaying stereoscopic images, the displacement between the joined transparent substrates can cause the problem that image quality is deteriorated because of the difference in brightness depending on a position on pixels, and enlarging the width of one of the light-shielding members can cause the problem that the opening ratio of the display section is decreased because of enlargement of the light-shielding section.

SUMMARY

There are disclosed illustrative image display devices as embodiments of the present invention.

The present invention has been achieved in view of the above problems, and one object of the invention is to provide an image display device which can avoid deterioration of imaging quality coming from a displacement between the joined first and second transparent substrates, in a structure that plural unit pixels each including a first-viewpoint pixel and a second-viewpoint pixel are arranged in a matrix such that plural unit pixels are arrayed in a first direction and plural unit pixels are arrayed in a second direction.

In order to solve the above problem, an illustrative image display device relating to the present invention is an image display device comprising: a first substrate on which first aperture areas are formed; a second substrate on which second aperture areas are formed; and an optical element put between the first substrate and the second substrate. The image display device further comprises a plurality of unit pixels arranged in a matrix wherein a plurality of the unit pixels are arrayed in a first direction and a plurality of the unit pixels are arrayed in a second direction being perpendicular to the first direction. Each of the unit pixels includes a first-viewpoint pixel for displaying an image for a first viewpoint and a second-viewpoint pixel for displaying an image for a second viewpoint. The first-viewpoint pixel and the second viewpoint pixel are formed of the optical element. The image display device further comprises an optical path distribution unit arranged on the second substrate. In the image display device, each of the first-viewpoint pixel and the second-viewpoint pixel transmits light, which has passed though one of the first aperture areas, through the optical element and emits the light through one of the second aperture areas, and the optical path distribution unit distributes the light which has passed through the first-viewpoint pixel and the light which has passed through the second-viewpoint pixel in different directions. The image display device further comprises a plurality of light-shielding areas each arranged between the first-viewpoint pixel and the second-viewpoint pixel. The first substrate and the second substrate are formed such that each of the light-shielding areas includes edge sections facing each other in the first direction, wherein one of the edge sections is defined by one of the first aperture areas and the other of the edge sections is defined by one of the second aperture areas, under a condition that the first substrate and the second substrate are joined together with no displacement therebetween (see FIG. 7A).

As for another illustrative image display device relating to the present invention, the first substrate and the second substrate are formed such that an aperture area of one of the first-viewpoint pixel and the second-viewpoint pixel includes at least two edge sections facing in the first direction and both of the two edge sections are defined by one of the first aperture areas and the second aperture areas, under a condition that the first substrate and the second substrate are joined together with no displacement therebetween (see FIG. 7A).

As for another illustrative image display device relating to the present invention, one of the light-shielding areas in one of the unit pixels includes an edge section facing the first-viewpoint pixel and an edge section facing the second-viewpoint pixel, wherein the edge section facing the first-viewpoint pixel is defined by one of the first aperture areas and the edge section facing the second-viewpoint pixel is defined by one of the second aperture areas. Further, one of the light-shielding areas in a next unit pixel to the one of the unit pixels in the second direction, includes an edge section facing the first-viewpoint pixel and an edge section facing the second-viewpoint pixel, wherein the edge section facing the first-viewpoint pixel is defined by one of the second aperture areas and the edge section facing the second-viewpoint pixel is defined by one of the first aperture areas (see FIG. 7A).

As for another illustrative image display device relating to the present invention, an aperture area of one of the first-viewpoint pixel and the second-viewpoint pixel in one of the unit pixels includes at least two edge sections facing in the first direction, where both of the two edge sections is defined by one of the first aperture areas and the second aperture areas. Further, an aperture area of the other of the first-viewpoint pixel and the second-viewpoint pixel in a next unit pixel to the one of the unit pixels in the second direction includes at least two edge sections facing in the first direction, where both of the two edge sections is defined by the one of the first aperture areas and the second aperture areas (see FIG. 7A). As for another illustrative image display device relating to the present invention, an aperture area of the first-viewpoint pixel in one of the unit pixels includes at least two edge sections facing in the first direction, where both of the two edge sections is defined by one of the first aperture areas and the second aperture areas. Further, each of an aperture area of the second-viewpoint pixel in a next unit pixel to the one of the unit pixels in the first direction, and an aperture area of the second-viewpoint pixel in a next unit pixel to the one of unit pixel in the second direction, includes at least two edge sections facing in the first direction, where both of the two edge sections is defined by the other of the first aperture areas and the second aperture areas.

As for another illustrative image display device relating to the present invention, one of the light-shielding areas in one of the unit pixels includes an edge section facing the first-viewpoint pixel and an edge section facing the second-viewpoint pixel, wherein the edge section facing the first-viewpoint pixel is defined by one of the first aperture areas and the edge section facing the second-viewpoint pixel is defined by one of the second aperture areas. Further, each of a light-shielding area in a next unit pixel to the one of the light-shielding areas in the first direction and a light-shielding area in a next unit pixel to the one of the unit pixels in the second direction, includes an edge section facing the first-viewpoint pixel and an edge section facing the second-viewpoint pixel, wherein the edge section facing the first-viewpoint pixel is defined by one of the second aperture areas and the edge section facing the second-viewpoint pixel is defined by one of the first aperture areas.

As for another illustrative image display device relating to the present invention, in each of the unit pixels, a border between the first-viewpoint pixel and the second-viewpoint pixel which face each other in the first direction is inclined at an angle θ with the second direction. Angles formed at both ends of a side of an aperture area of one of the first-viewpoint pixel and the second viewpoint pixel, where the side is in contact with the border, are defined by the expressions: $\pi/2+\theta$ and $(\pi/2-\theta)+\tan^{-1}(d1/((h-d1)\times\tan\theta))$, and each of angles has a value in a range from almost 60° to almost 120°, where the angle θ is 90° or less, d1 is a direction component of a width of the border measured in the second direction, h is a direction component of the width of the aperture area of the one of the first-viewpoint pixel and the second viewpoint pixel measured in the second direction (See FIG. 18).

In the illustrative image display devices, the optical path distribution unit may include a cylindrical lens (See FIG. 4).

In the illustrative image display devices, the optical path distribution unit may include a parallax barrier (See FIG. 16).

According to the embodiments, even under the condition that the first substrate and the second substrate are joined together with displacement caused depending on a manufacturing accuracy and that a change in the shape of the aperture areas coming from the displacement causes a brightness change, a brightness distribution obtained by composed brightness of neighboring unit pixels is equivalent to that under an ideal condition that there is no displacement between the substrates. It allows realizing an image display device wherein deterioration of display quality coming from the displacement is not occurred.

Further, the light-shielding area which corresponds to a border between a first-viewpoint pixel and a second-viewpoint pixel is defined by an edge section of a light-shielding member on the first substrate (for example, a second control wire) and an edge section of a light-shielding member of the second substrate (for example, a black matrix). Thereby, there is no need to increase the light-shielding width, and an image display device including pixels with a high opening ratio can be realized.

When the optical path distribution unit is formed of a parallax barrier, an inexpensive image display device can be realized.

Further, the structures of the embodiments can realize a stereoscopic image display device which can cope with multi-viewpoint stereoscopic images.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1:
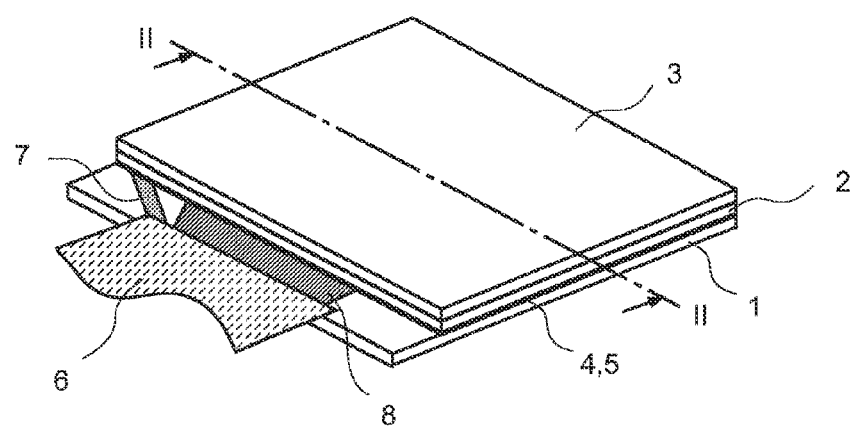
FIG. 1 is a perspective view illustrating a structure of a display device relating to Example 1.

Illustrative embodiments of image display devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

As described in the above description about the background, there have been proposed a stereoscopic image display devices employing a glassless method such as a parallax barrier method and a lenticular lens method. In a stereoscopic image display device using a liquid crystal display device, an aperture area of each pixel is composed of a light-shielding member (such as a wire) formed on a first substrate (a substrate at the side of TFT) and a light-shielding member (such as a black matrix) formed on a second substrate (a substrate at the side of a common electrode). When the first substrate and the second substrate has been joined together with manufacturing displacement, the displacement can causes the problem that image quality is deteriorated because of the difference in brightness depending on a position on pixels, and enlarging the width of one of the light-shielding members causes the problem that the opening ratio of a display section decreases because of enlargement of the light-shielding section.

Therefore, one embodiment of the present invention provides a structure that a plurality of unit pixels are arranged in a matrix wherein a plurality of the unit pixels are arrayed in a first direction and a plurality of the unit pixels are arrayed in a second direction being perpendicular to the first direction. Each of the unit pixels includes a first-viewpoint pixel for displaying an image for a first viewpoint and a second-viewpoint pixel for displaying an image for a second viewpoint. In the structure, there are provided a plurality of light-shielding areas each arranged between the first-viewpoint pixel and the second-viewpoint pixel. Further, the first substrate and second substrate are formed such that each of the light-shielding areas includes edge sections facing each other in the first direction, where one of the edge sections is defined by one of the first aperture areas and the other of the edge sections is defined by one of the second aperture areas, under a condition that the first substrate and the second substrate are joined together with no displacement therebetween. Optionally, when one of the light-shielding areas in one of the unit pixels includes an edge section facing the first-viewpoint pixel and an edge section facing the second-viewpoint pixel, where the edge section facing the first-viewpoint pixel is defined by one of the first aperture areas and the edge section facing the second-viewpoint pixel is defined by one of the second aperture areas, one of the light-shielding areas in the next unit pixel neighboring in at least one of the first direction and the second direction, includes an edge section facing the first-viewpoint pixel and an edge section facing the second-viewpoint pixel, where the edge section facing the first-viewpoint pixel is defined by one of the second aperture areas and the edge section facing the second-viewpoint pixel is defined by one of the first aperture areas.

In other words, the first substrate and the second substrate are formed such that an aperture area of one of the first-viewpoint pixel and the second-viewpoint pixel includes at least two edge sections facing in the first direction and both of the two edge sections are defined by one of the first aperture areas and the second aperture areas, under a condition that the first substrate and the second substrate are joined together with no displacement therebetween. Optionally, an aperture area of the other of the first-viewpoint pixel and the second-viewpoint pixel in the next unit pixel neighboring in at least one of the first direction and the second direction includes at least two edge sections facing in the first direction, where one of the two edge sections is defined by the one of the first aperture areas and the second aperture areas.

In the above structure, when the displacement between the joined substrates has been caused, a light-shielding area between a pair of pixels is reduced in area and the vicinity of the area becomes brighter. Further, a light-shielding area between a pair of pixels of the neighboring unit pixel is increased in area and the vicinity of the area becomes dark. However, the composite brightness of them is almost the same in comparison with the case that no displacement has been caused. Therefore, the structure can inhibit occurrence of a deteriorated moiré pattern.

EXAMPLES

Figure 2:
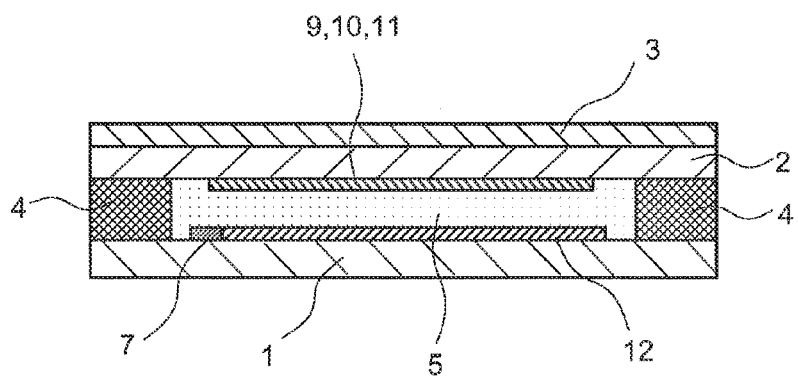
FIG. 2 is a sectional view of the display device relating to Example 1.
Figure 3:
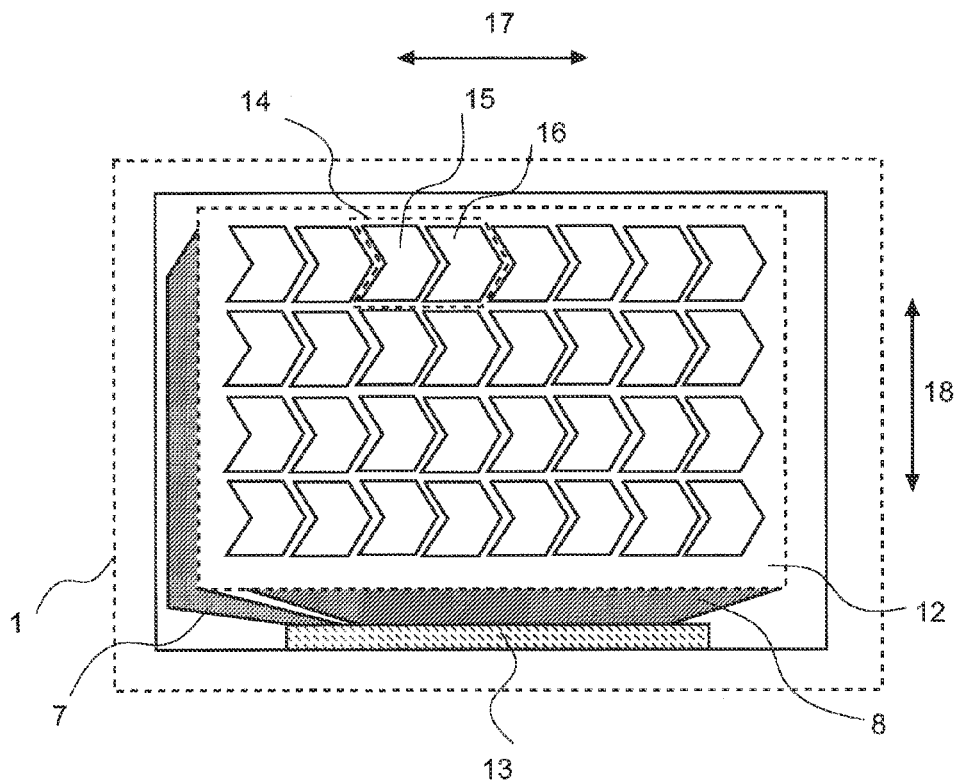
FIG. 3 is a plan view showing a structure of the first substrate of Example 1.
Figure 4:
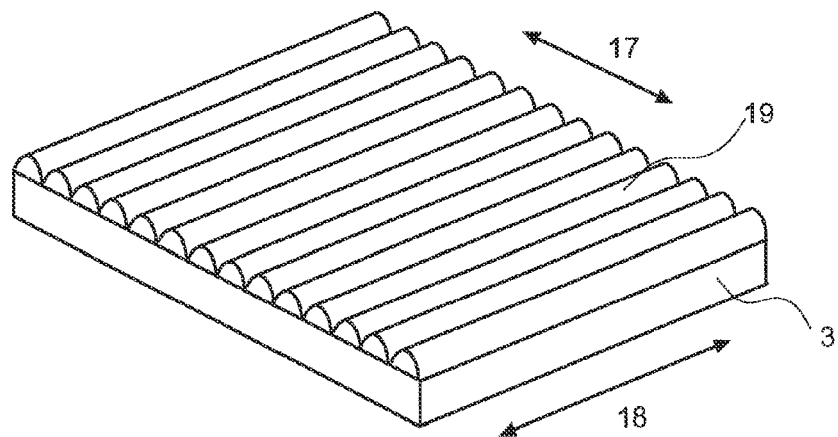
FIG. 4 is a perspective view showing an optical path distribution unit of Example 1.
Figure 5:
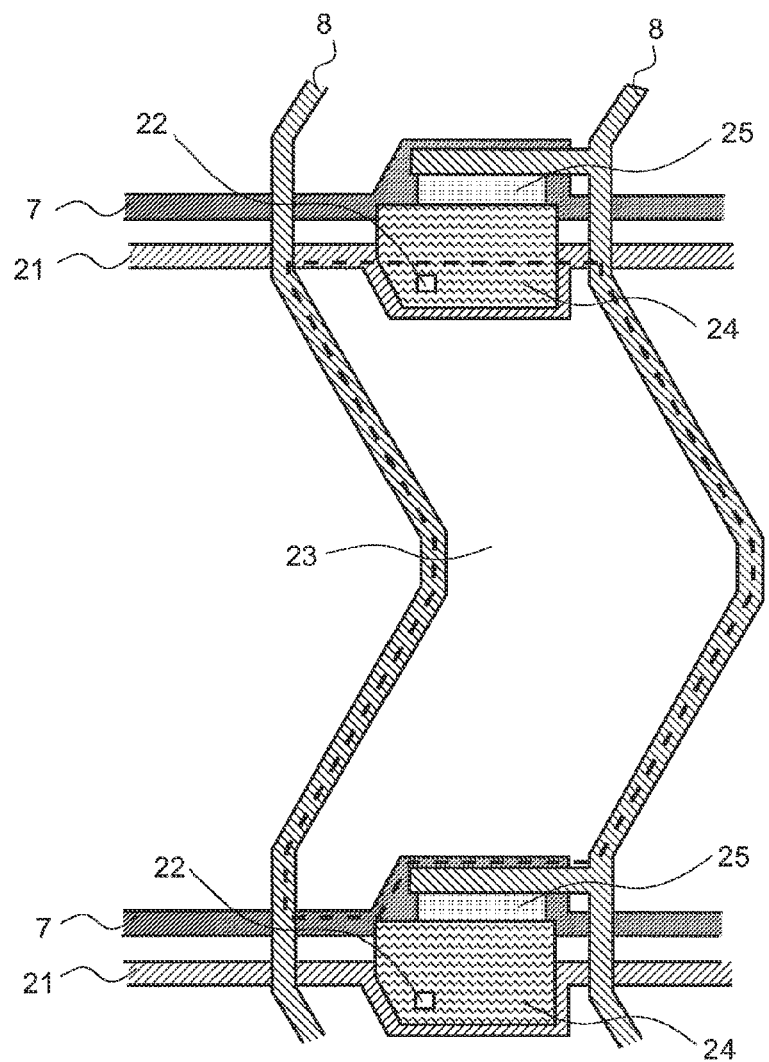
FIG. 5 is a plan view showing a structure of a unit pixel of Example 1.
Figure 6:
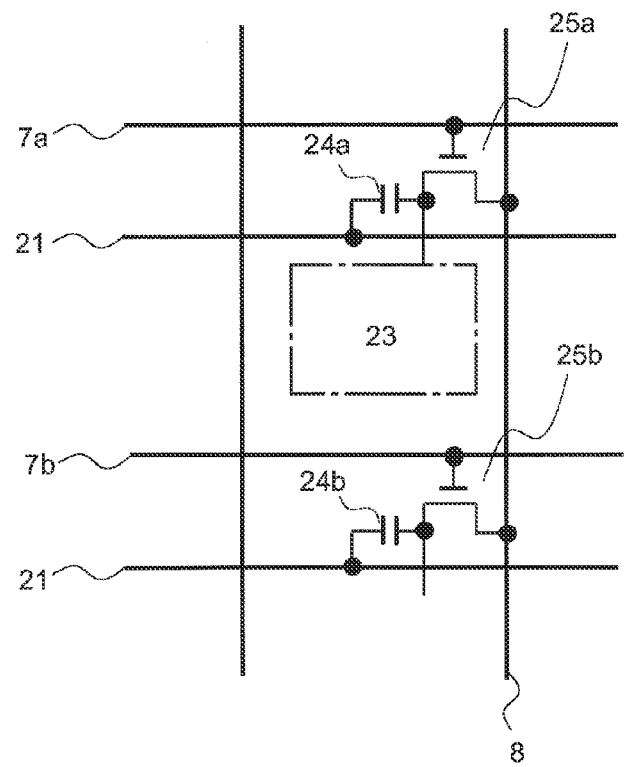
FIG. 6 shows an electrical circuit diagram of a unit pixel of Example 1.
Figure 7A:
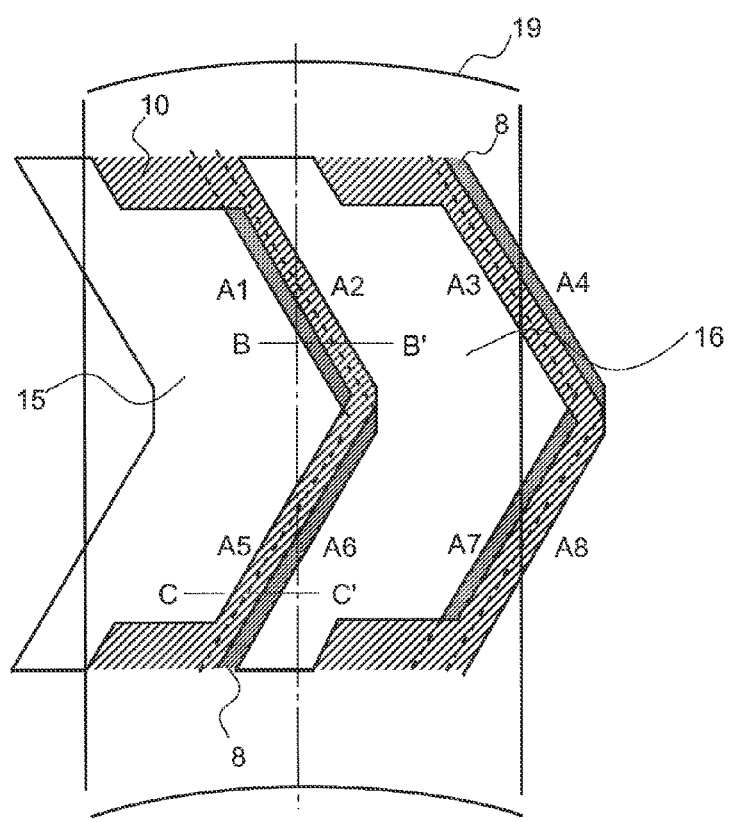
FIG. 7A is a detail view showing a structure of a unit pixel of Example 1.
Figure 7B:
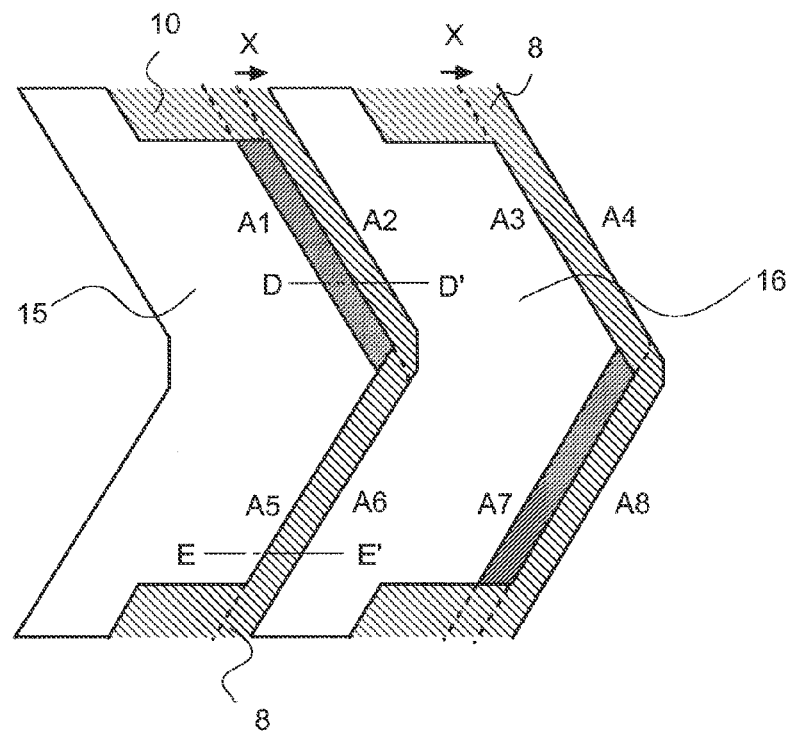
FIG. 7B is a detail view showing a structure of a unit pixel of Example 1.
Figure 7C:
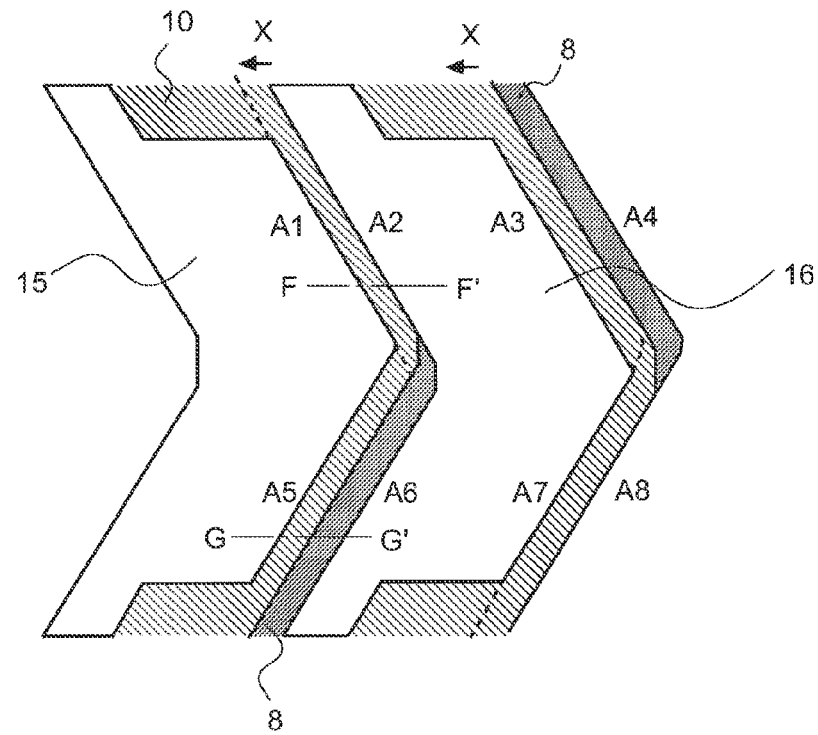
FIG. 7C is a detail view showing a structure of a unit pixel of Example 1.
Figure 8:
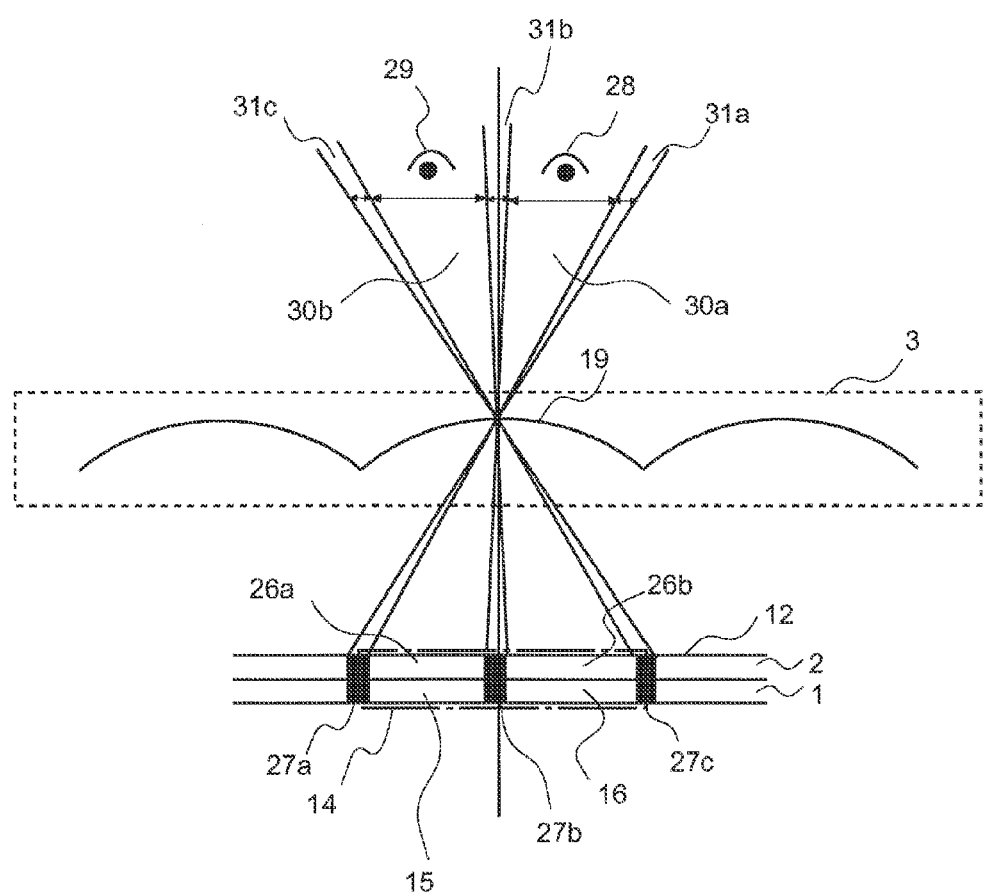
FIG. 8 is an optical model diagram of a display device and a viewer in Example 1.
Figure 9A:
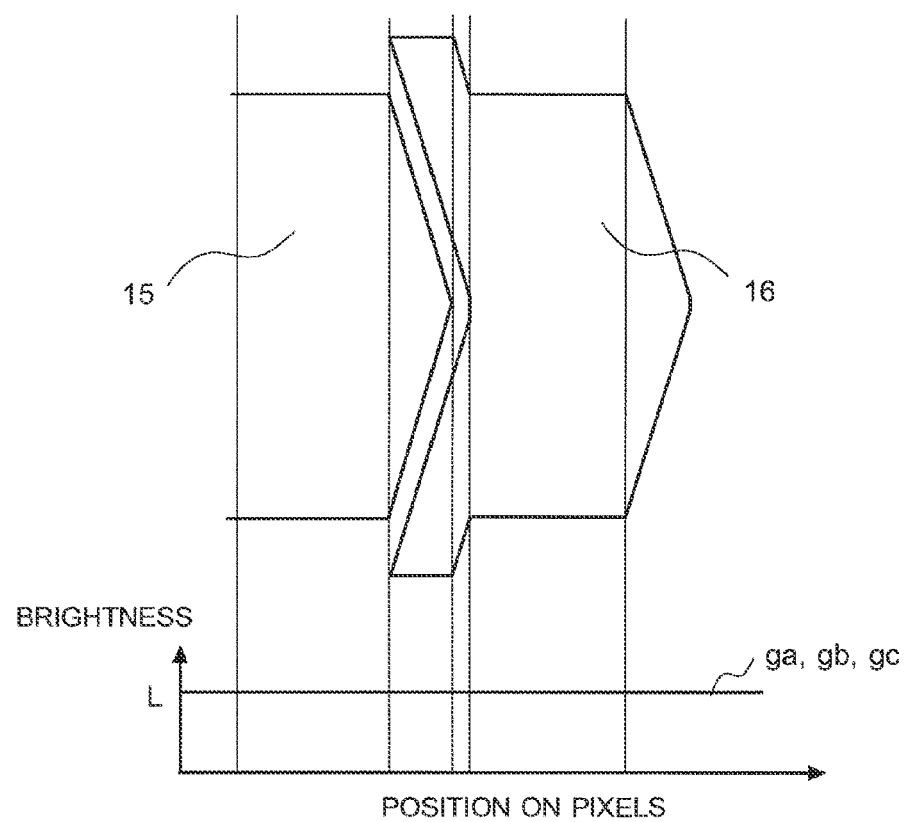
FIG. 9A is a graph showing a brightness distribution on a viewing surface of a display device of Example 1.
Figure 9B:
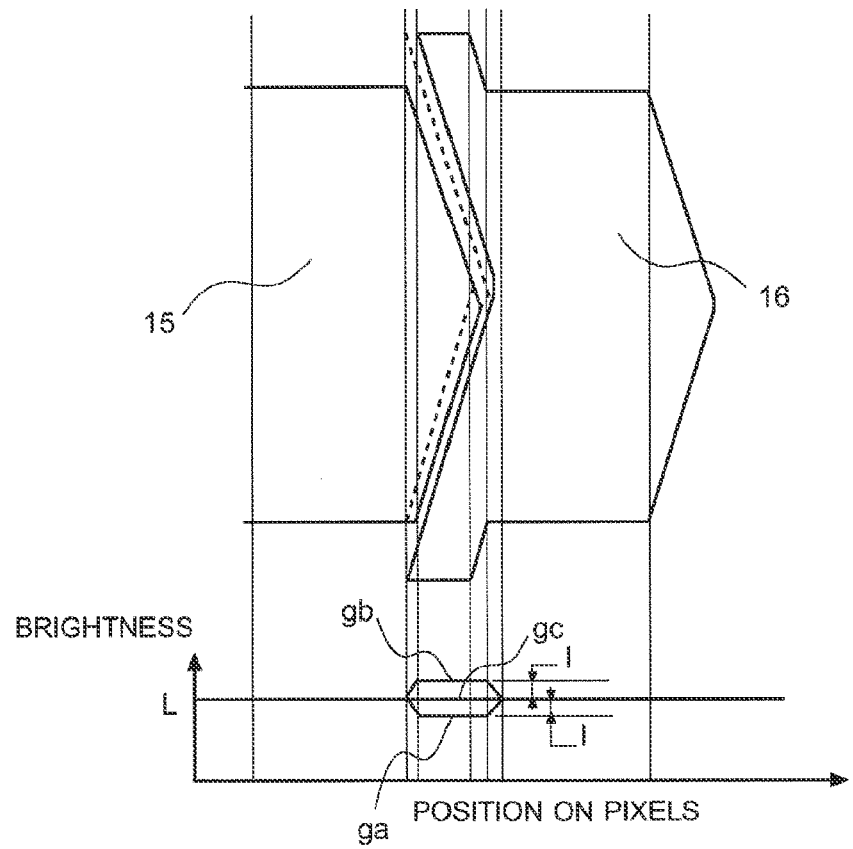
FIG. 9B is a graph showing a brightness distribution on a viewing surface of a display device of Example 1.
Figure 9C:
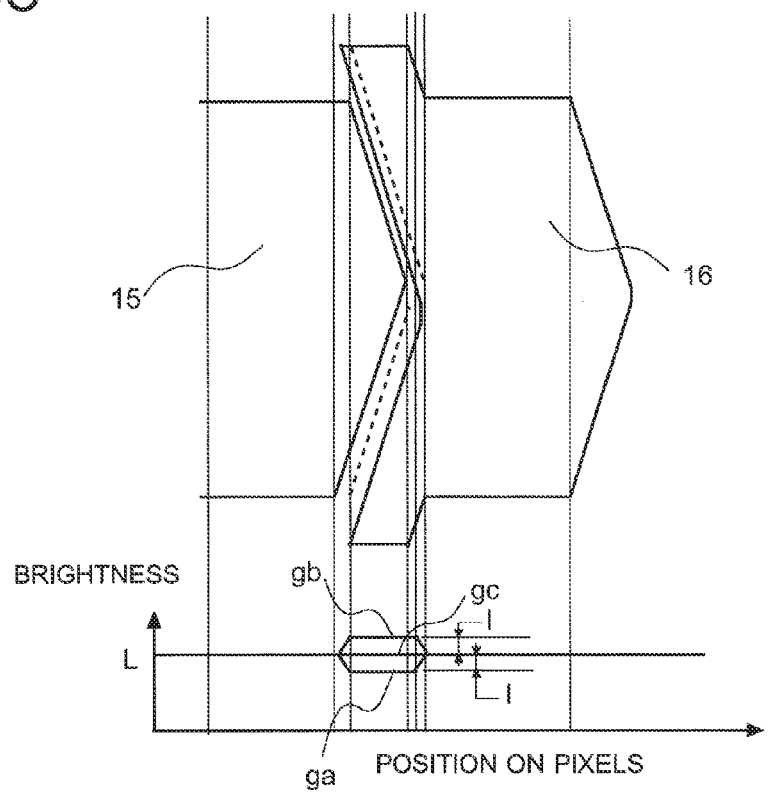
FIG. 9C is a graph showing a brightness distribution on a viewing surface of a display device of Example 1.

An image display device relating to Example 1 of the present invention will be described below with reference to FIGS. 1 to 9, in order to illustrate the above-described embodiments of the present invention in detail. FIG. 1 is a perspective view illustrating a structure of a display device of Example 1. FIG. 2 is a sectional view of the display device of Example 1. FIG. 3 is a plan view showing a structure of a first substrate of Example 1. FIG. 4 is a perspective view showing an optical path distribution unit in Example 1. FIG. 5 is a plan view showing a structure of a unit pixel of Example 1. FIG. 6 shows an electrical circuit diagram of a unit pixel of Example 1. Each of FIGS. 7A to 7C is a detail view showing a structure of a unit pixel of Example 1. FIG. 8 is an optical model diagram of a display device and a viewer in Example 1. Each of FIGS. 9A to 9C is a graph showing a brightness distribution on a viewing surface of a display device of Example 1.

First, a structure of an image display device relating to Example 1 will be concretely described below, with reference to the drawings.

As shown in FIG. 1, an image display device of Example 1 is composed of components including first substrate 1, second substrate 2, optical path distribution unit 3, holding member 4, liquid crystal layer 5, cable for a connection to an external device 6, first control wires 7, and second control wires 8.

FIG. 2 is a sectional view taken along line II-II in FIG. 1. Holding member 4 is put between first substrate 1 and second substrate 2 makes a gap between first substrate 1 and second substrate 2. By using the gap, liquid crystal layer 5 as an optical element is arranged inside holding members 4.

As shown in FIG. 2 and FIG. 3, first substrate 1 is composed of components including arrayed terminal for a connection to an external device 13, first control wires 7 (gate lines), second control wires 8 (drain lines), and pixel array 12. Terminal array for a connection to an external device 13 provides a terminal for electrically connecting cable for a connection to an external device 6 to first control wires 7, second control wires 8, and other wires which are not illustrated. First control wires 7 and second control wires 8 are the wires for transmitting control signal outputted from an external connection device which is not illustrated to pixel array 12. In pixel array 12, displaying units (hereinafter, called as unit pixels 14) each composed of a pixel for displaying an image for a first viewpoint (hereinafter, called as first-viewpoint pixel 15) and a pixel for displaying an image for a second viewpoint (hereinafter, called as second-viewpoint pixel 16) are arranged in a matrix such that plural unit pixels are arrayed in both of first direction 17 (the extending direction of gate lines) and second direction 18 (the direction perpendicular to the extending direction of gate lines). In this example, there is shown a structural example wherein unit pixels 14 are arrayed such that four lines of unit pixels are arranged along first direction 17 and four lines of unit pixels are arranged along second direction 18, as an example.

On a surface facing liquid crystal layer 5 of first substrate 1, there is arranged pixel array 12, and are arranged first control wires 7 and second control wires 8 so as to pass through pixel array 12.

As shown in FIG. 2, there are arranged color filter 9, black matrix 10 and common electrode 11 on a surface facing liquid crystal layer 5 of second substrate 2. Color filter 9 has a function to transmit light which has passed through liquid crystal layer 5 with limiting the spectrum of the light into an arbitrary spectral region, and has various color elements arranged along second direction 18. It is preferable that the color elements are composed of primary colors of red, blue and green. Black matrix 10 has a function to avoid the neighboring color elements of color filter 9 from being mixed together, and to avoid light coming from an external light source which is not illustrated from leaking the inside. Common electrode 11 is used for applying electric signal to liquid crystal layer 5, and is preferably formed of a material which has both of high transmittance and highly electrically conductivity because common electrode 11 is required to transmit light emitted from an external light source which is not illustrated.

There is arranged optical path distribution unit 3 is on the surface of the second substrate 2 opposite from liquid crystal layer 5.

As shown in FIG. 4, optical path distribution unit 3 includes cylindrical lenses 19 extending in second direction 18, arrayed along first direction 17.

As shown in FIG. 5, one of first-viewpoint pixel 15 and for second-viewpoint pixel 16 shown in FIG. 3 is composed of components including first control wires 7, second control wires 8, storage capacitance lines 21, contact hole for pixel electrode 22, pixel electrode 23, storage capacitance 24 and control element 25. First control wire 7 is a wire for transmitting control signal for bringing control element 25 into an activated state or a deactivated state. Second control wire 8 is a wire for transmitting image signal to he applied to liquid crystal layer 5. Storage capacitance 24 includes storage capacitance line 21 and an electrode electrically connected to control element 25 which face each other with an insulating film put between them, to have a function to maintain the electric potential of the image signal for a certain period. Contact hole for a pixel electrode 22 is arranged for electrically connecting control element 25 to pixel electrode 23. Pixel electrode 23 is arranged for applying electrical potential difference between the electrical potential of inputted image signal and the electrical potential of common electrode 11, to liquid crystal layer 5. Similarly to common electrode 11, pixel electrode 23 is preferably formed of a material which has both of high transmittance and highly electrically conductivity.

FIG. 6 is a diagram representing the structure of FIG. 5 by using symbols of an electrical circuit. That is, each of control elements 25a and 25b is represented as one transistor. Each of storage capacitances 24a and 24b is represented as one condenser. While pixel electrode 23 is paired with un-illustrated common electrode 11 to form a condenser, common electrode 11 is at a fixed electric potential and only pixel electrode 23 whose electric potential varies is represented in this diagram for reasons of convenience. Gates of control elements 25a and 25b are connected to first control wires 7a and 7h, respectively. Sources (drains) of control elements 25a and 25b are connected to second control wire 8.

FIG. 7A shows a plan view of unit pixel 14 under an ideal condition that first substrate 1 and second substrate 2 shown in FIG. 2 and FIG. 3 is joined together with no displacement completely. Black matrix 10 in FIG. 7A shows a shape viewed from a surface, on which optical path distribution unit 19 is arranged, of second substrate 2.

Herein, an aperture area is defined as an area where light coming from an external light source which is not illustrated can passes through without being blocked by a certain object formed on each of first substrate 1 and second substrate 2 (for example, first control wire 7, second control wire 8 and storage capacitance 24 on first substrate 1, and black matrix 10 on second substrate 2) and can be emitted to optical path distribution unit 13.

On the other hand, a light-shielding member is defined as an area, in contrary to the aperture area, light coming from an external light source which is not illustrated is blocked by a certain object formed on each of first substrate 1 and second substrate 2, and is not emitted to optical path distribution unit 13.

In the area between first-viewpoint pixel 15 and second-viewpoint pixel 16, the border between the aperture area and the light shielding section in the area at the side of first-viewpoint pixel 15 (area A1 in FIG. 7A) is defined by an edge section of second control wire 8. On the other hand, the edge of the aperture area in the area at the side of second-viewpoint pixel 16 (area A2 in FIG. 7A) is defined by an edge section of black matrix 10.

Similarly, the border between the aperture area and the light-shielding section in area A3 in FIG. 7A is defined by an edge section of black matrix 10, and that in area A4 in FIG. 7A is defined by an edge section of second control wire 8. That in area A5 in FIG. 7A is defined by an edge section of black matrix 10, and that in area A6 in FIG. 7A is defined by an edge section of second control wire 8. That in area A7 in FIG. 7A is defined by an edge section of second control wire 8, and those in area A8 in FIG. 7A is defined by an edge section of black matrix 10.

As described above, the borders between the aperture area and the light-shielding section around the second control wire 8 are defined by the edge section of second control wire 8 or the edge section of black matrix 10. It keeps the relationship that one side of a border area is defined by an edge section of second control wire 8 and the other side is defined by an edge section of black matrix 10 in one unit pixel. It further has the relationship that the positions of the edge section of second control wire 8 and the edge section of black matrix 10 are reversed in a border area between one of first-viewpoint pixel 15 and second-viewpoint pixel 16 and another border area in the next unit pixel 14.

That is, the first substrate and the second substrate are formed such that each of the light-Shielding areas includes edge sections facing each other in the first direction, where one of the edge sections is defined by one of the first aperture areas formed on the first substrate and the other of the edge sections is defined by one of the second aperture areas formed on the second substrate, under a condition that the first substrate and the second substrate are joined together with no displacement therebetween. Further, when one of the light-shielding areas in one of the unit pixels includes an edge section facing the first-viewpoint pixel and an edge section facing the second-viewpoint pixel, where the edge section facing the first-viewpoint pixel is defined by one of the first aperture areas and the edge section facing the second-viewpoint pixel is defined by one of the second aperture areas, one of the light-shielding areas in the next unit pixel neighboring in at least one of the first direction and the second direction, includes an edge section facing the first-viewpoint pixel and an edge section facing the second-viewpoint pixel, where the edge section facing the first-viewpoint pixel is defined by one of the second aperture areas and the edge section facing the second-viewpoint pixel is defined by one of the first aperture areas.

In other words, the first substrate and the second substrate are formed such that an aperture area of one of the first-viewpoint pixel and the second-viewpoint pixel includes at least two edge sections facing in the first direction and both of the two edge sections are defined by one of the first aperture areas and the second aperture areas, under a condition that the first substrate and the second substrate are joined together with no displacement therebetween. Further, an aperture area of the other of the first-viewpoint pixel and the second-viewpoint pixel in the next unit pixel neighboring in at least one of the first direction and the second direction includes at least two edge sections facing in the first direction, where one of the two edge sections is defined by the one of the first aperture areas and the second aperture areas.

As for cylindrical lenses 19 constructing optical-path distribution unit 3 is arranged as shown in FIG. 7A, one of cylindrical lenses 19 is arranged for a column of unit pixels 14. Employing this structure enables two kinds of light emitted from pixel for first-viewpoint pixel 15 and for second-viewpoint pixel to be distributed into different directions through cylindrical lens 19, respectively.

FIG. 7B shows a plan view of unit pixel 14 under the situation that first substrate 1 is fixed and second substrate 2 is joined to first substrate 1 with being displaced to the left in first direction 17 by length X.

In areas A1 and A2 in FIG. 7B, the right-edge section of black matrix 10 (A2) exists at a position which is shifted to the right by length X, which enlarges the light-shielding section and makes the areas dark in comparison with the situation that there is no displacement. In areas A3 and A4 in FIG. 7B, the left-edge section of black matrix 10 (A3) exists at a position which is shifted to the right by length X, which makes the light-shielding section small and makes the areas bright in comparison with the situation that there is no displacement. In areas A5 and A6 in FIG. 79, the left-edge section of black matrix 10 (A5) exists at a position which is shifted to right by length X, which makes the light-shielding section small and becomes bright in comparison with the situation that there is no displacement. In areas A7 and A8 in FIG. 79, the right-edge section of black matrix 10 (A2) exists at a position which is shifted to the right by length X, which enlarges the light-shielding section and makes the areas dark in comparison with the situation that there is no displacement.

FIG. 7C shows a plan view of unit pixel 14 under the situation that first substrate 1 is fixed and second substrate 2 is joined to first substrate 1 with being displaced to the left in first direction 17 by length X.

In areas A1 and A2 in FIG. 7C, the right-edge section of black matrix 10 (A2) exists at a position which is shifted to the left by length X, which makes the light-shielding section small and makes the area bright in comparison with the situation that there is no displacement. In areas A3 and A4 in FIG. 7C, the left-edge section of black matrix 10 (A3) exists at a position which is shifted to the left by length X, which enlarges the light-shielding section and makes the areas dark in comparison with the situation that there is no displacement. In areas A5 and A6 in FIG. 7C, the left-edge section of black matrix 10 (A5) exists at a position which is shifted to the left by length X, which enlarges the light-shielding section and makes the areas dark in comparison with the situation that there is no displacement. In areas A7 and A5 in FIG. 7C, the right-edge section of black matrix 10 (A8) exists at a position which is shifted to the left by length X, which makes the light-shielding section small and makes the areas bright in comparison with the situation that there is no displacement.

Next, operations of Example 1 will be concretely described with reference to the drawings.

First, the driving way of the structural example of FIG. 5 will be described with reference to FIG. 6.

When first control wire 7a is changed to carry electric potential Vgon which can bring control element 25a to an activated condition, control section 25a is brought into an activated condition and supplies image signal to both of pixel electrode 23 and storage capacity 24a. Next, when first control sire 7a is changed to carry electric potential Vgoff, control section 25a is brought into a deactivated condition.

As described above, when image-signal voltage is applied to pixel electrode 23, liquid crystal layer 5 which is put between pixel electrode 23 and control electrode 11 is controlled to have transmittance corresponding to the image-signal voltage, which allows adjustment of light from the external light source.

Next, there will be described how rays of light emitted from pixel array 12 enter eyes of a viewer through optical path distribution unit 3 with reference to FIG. 8.

Light which has been emitted from aperture area 26a of first-viewpoint pixel 15, passes through cylindrical lens 19 forming optical path distribution unit 3, and thereby is emitted to form display area 30a. Also light which has been emitted from aperture area 26b of second-viewpoint pixel 16 passes through cylindrical lens 19, and thereby is emitted to form display area 30b. Under this situation, when a viewer is put at the position such that the left eye 28 is located in display area 30a and the right eye is located in display area 30b, an image for the first viewpoint enters the left eye and an image for the second view point enters the right eye. The image for the first viewpoint and the image for the second viewpoint are images providing parallax for constructing a stereoscopic image. When the image for the first viewpoint has been prepared for left eye 28 and the image for the second viewpoint has been prepared for right eye 29, the viewer can perceive the stereoscopic image. On the other hand, this structure makes non-display areas 31a, 31b and 31c.

Brightness distribution at the viewing position of first-viewpoint pixel 15 and second viewpoint pixel 16 will be described with reference to FIGS. 9A to 9C.

FIG. 9A shows line ga representing the brightness distribution on the upper half of both of first-viewpoint pixel 15 and second-viewpoint pixel 16, line gb representing the brightness distribution on the lower half of both of first-viewpoint pixel 15 and second-viewpoint pixel 16, and line gc representing the composition of brightness distribution of line La and brightness distribution of line Lb, with the horizontal axis for the viewing position and the vertical axis for brightness distribution.

Both of lines ga and gb show the distribution keeping almost the constant brightness L at every viewing positions and fit each other on the same graph area. Similarly, line gc fits to lines ga and gb.

FIG. 9B shows line ga representing the brightness distribution on the upper half of both of first-viewpoint pixel 15 and second-viewpoint pixel 16 in FIG. 7B, line gb representing the brightness distribution on the lower half of both of first-viewpoint pixel 15 and second-viewpoint pixel 16 in FIG. 7B, and line gc representing the composition of brightness distribution of line La and brightness distribution of line Lb, with the horizontal axis for the viewing position and the vertical axis for brightness distribution.

Because FIG. 7B shows the condition that second substrate 2 is displaced from first substrate 1 to the right along first direction 17, the edge portion of black matrix 10 of second substrate 2 moves in the right direction of FIG. 7B. Therefore, in the upper portion of each of first-viewpoint pixel 15 and second-viewpoint pixel 16, aperture area 26b is narrowed by the area of A1 (that is, light-shielding section 27 is widened). As the result, as shown by line ga, the brightness is deteriorated by the amount of 1. In the lower portion of each of first-viewpoint pixel 15 and second-viewpoint pixel 16, black matrix 10 on second substrate 2 moves in the right direction of FIG. 7B and aperture area 26a is widened by the area of A5 in FIG. 7B. As the result, as shown by line gb, the brightness is enhanced by the amount of 1. Accordingly, the upper portions and the lower portions in unit pixel 14 supplement with each other, and thereby, line gc shows the almost constant brightness L similarly to FIG. 9A.

FIG. 9C shows line ga representing the brightness distribution on the upper half of both of first-viewpoint pixel 15 and second-viewpoint pixel 16 in FIG. 7C, line gb representing the brightness distribution on the lower half of both of first-viewpoint pixel 15 and second-viewpoint pixel 16 in FIG. 7B, and line gc representing the composition of brightness distribution of line La and brightness distribution of line Lb, with the horizontal axis for the viewing position and the vertical axis for brightness distribution.

Because FIG. 7C shows the condition that second substrate 2 is displaced from first substrate 1 in the left direction along first direction 17, the edge portion of black matrix 10 of second substrate 2 moves in the left direction of FIG. 7C. Therefore, in the upper portion of each of first-viewpoint pixel 15 and second-viewpoint pixel 16, aperture area 26h is widened by the area of A2 (that is, light-shielding section 27 is narrowed). As the result, as shown by line ga, the brightness is enhanced by the amount of 1. In the lower portion of each of first-viewpoint pixel 15 and second-viewpoint pixel 16, black matrix 10 on second substrate 2 moves in the left direction of FIG. 7C and aperture area 26a is narrowed by the area of A6 in FIG. 7B. As the result, as shown by line gb, the brightness is deteriorated by the amount of 1. Accordingly, the upper portions and the lower portions of unit pixel 14 supplement with each other, and thereby, line gc shows the almost constant brightness L similarly to FIG. 9A.

In other words, when second substrate 2 is arranged with being displaced, that is, when the displacement between the joined substrates is caused, pixels of the present example are capable of keeping the almost same brightness similarly to the ideal condition wherein there is no displacement and are capable of avoiding deterioration of image quality coming from fluctuation of the brightness.

As described above, according to Example 1, under the condition that first substrate 1 and second substrate 2 are joined together with displacement because of manufacturing accuracy, brightness distribution of aperture areas of neighboring unit pixels 14 is consistent to the ideal condition that there is no displacement even when the brightness has been changed because of the change in the shape of the aperture areas coming from the displacement between the joined substrates, which is capable of realizing an image display device which can avoid deterioration of display quality coming from the displacement between the joined substrates.

Further, because the light-shielding width is defined by the edge potion of second control wire 8 on first substrate 1 and the edge portion of black matrix 10 on second substrate, there is no need to widen the light-shielding width, which enables to realize an image display device having pixels with a high opening-area ratio.

Example 2

Figure 10:
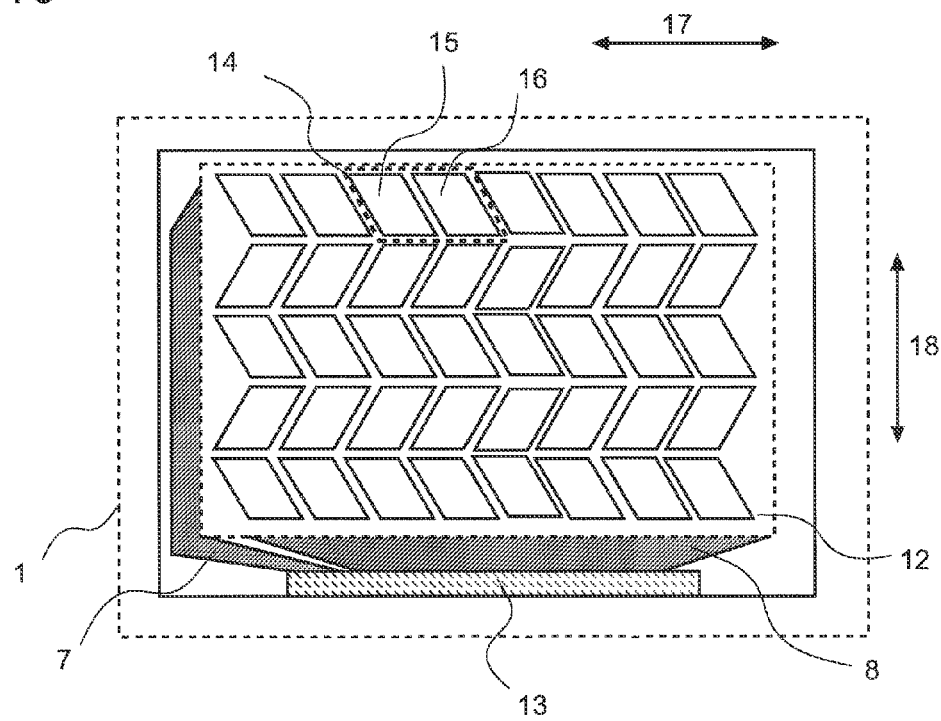
FIG. 10 is a plan view showing a structure of a first substrate of Example 2.
Figure 11:
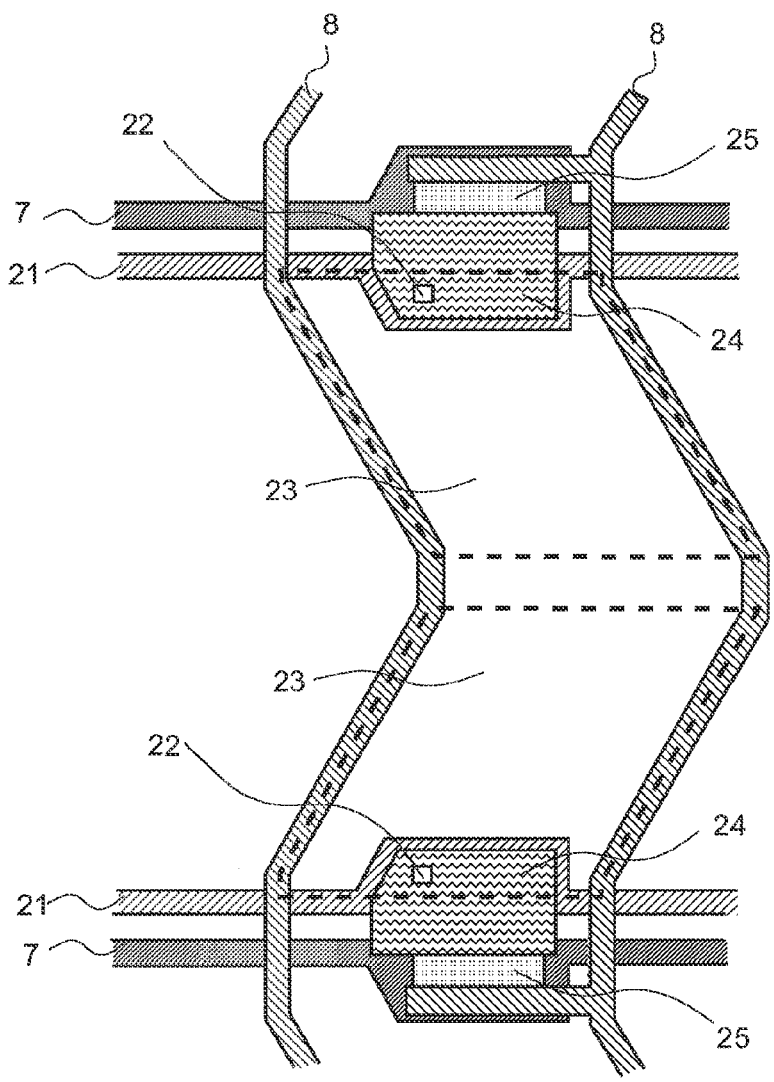
FIG. 11 is a plan view showing a structure of a unit pixel of Example 2.
Figure 12:
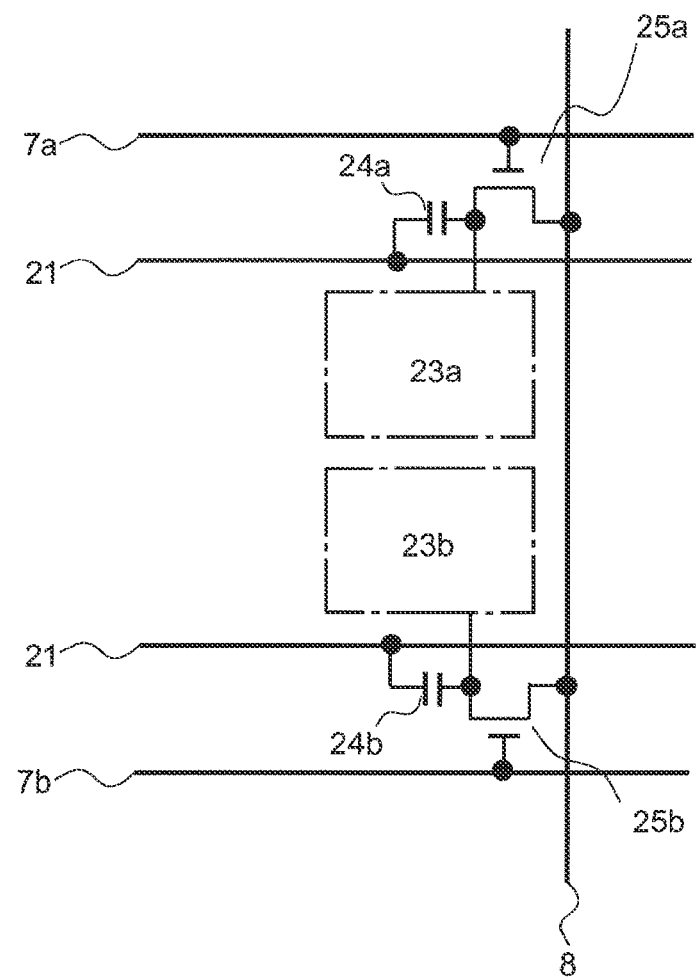
FIG. 12 shows an electrical circuit diagram of a unit pixel of Example 2.
Figure 13A:
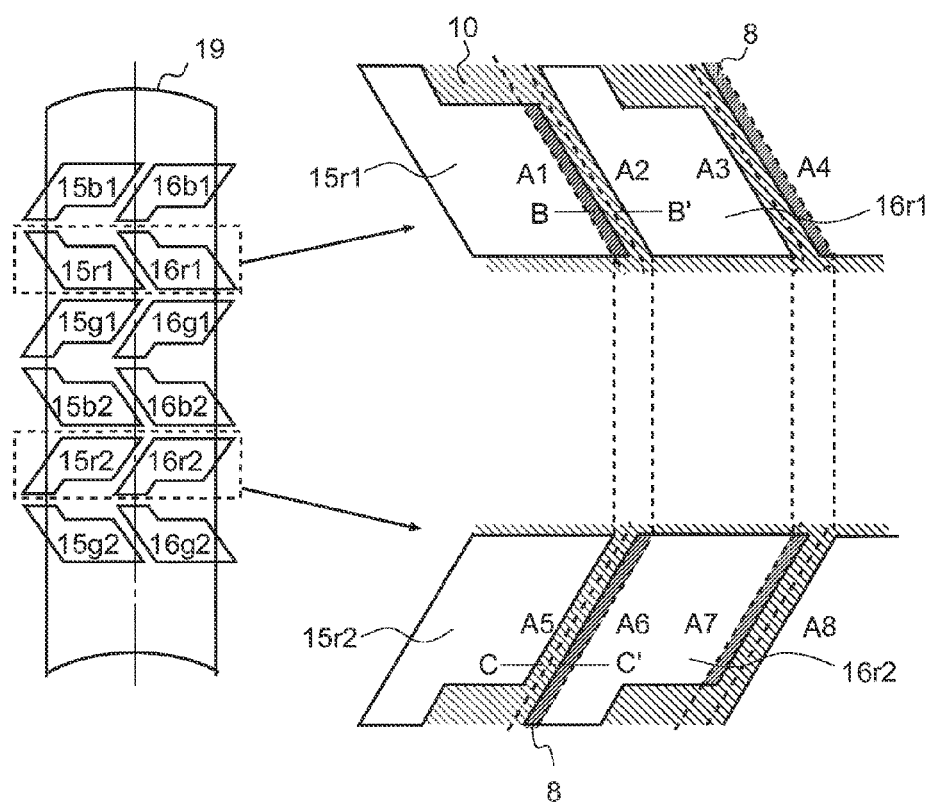
FIG. 13A is a detail view showing a structure of a unit pixel of Example 2.
Figure 13B:
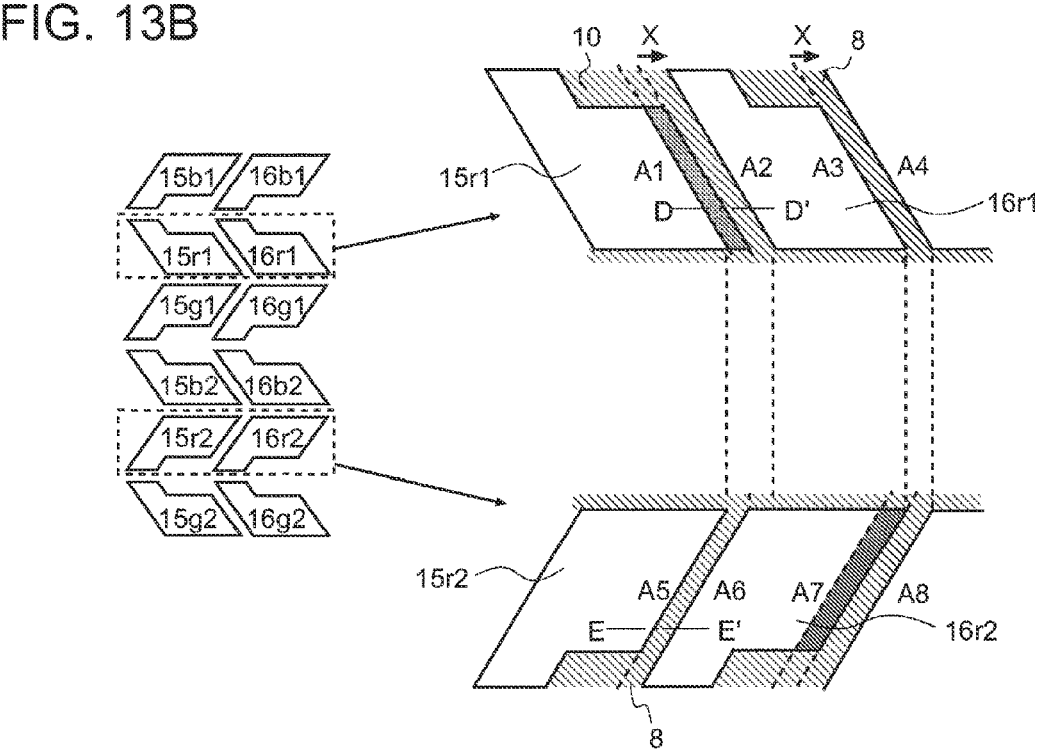
FIG. 13B is a detail view showing a structure of a unit pixel of Example 2.
Figure 13C:
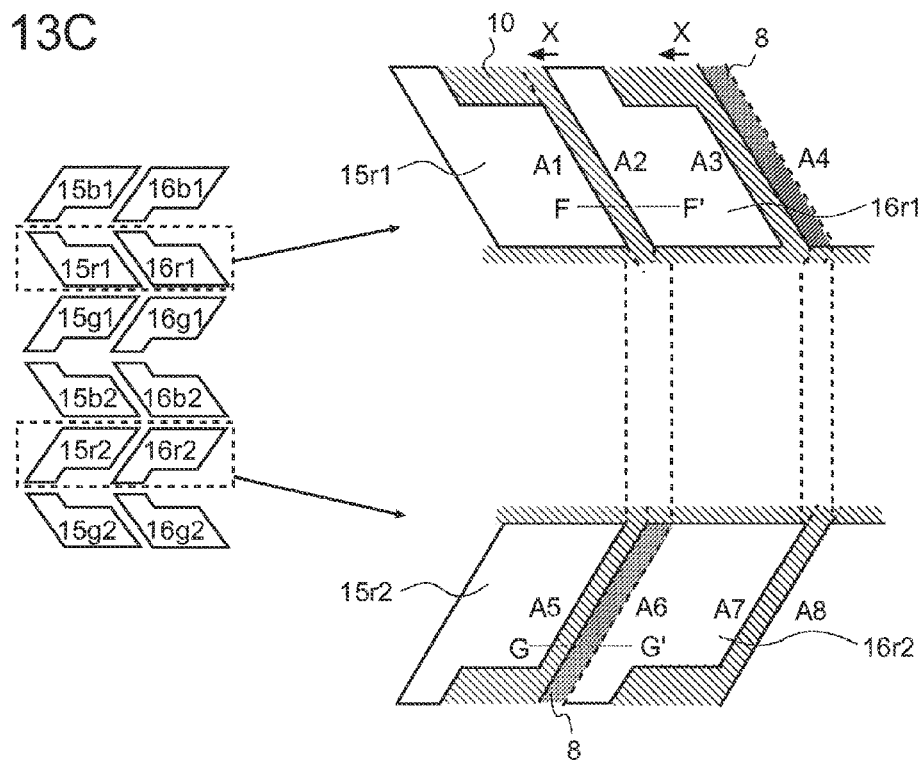
FIG. 13C is a detail view showing a structure of a unit pixel of Example 2.
Figure 14:
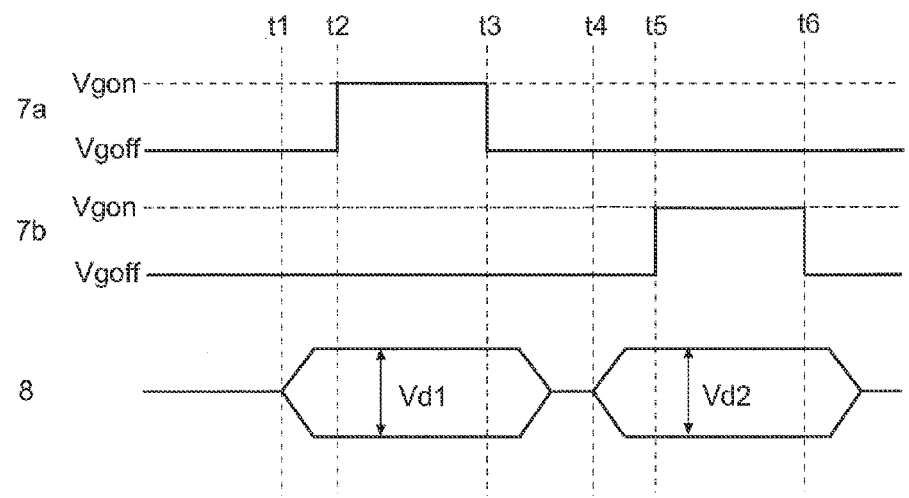
FIG. 14 is a timing diagram showing the driving way in Example 2.
Figure 15A:
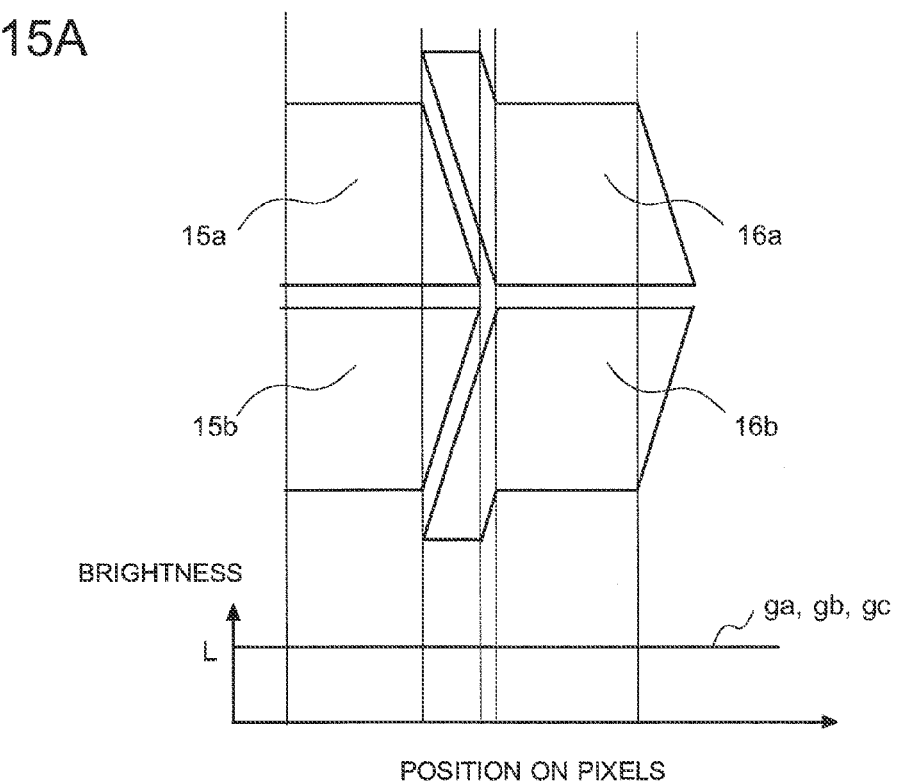
FIG. 15A is a graph showing a brightness distribution on a viewing surface of a display device of Example 2.
Figure 15B:
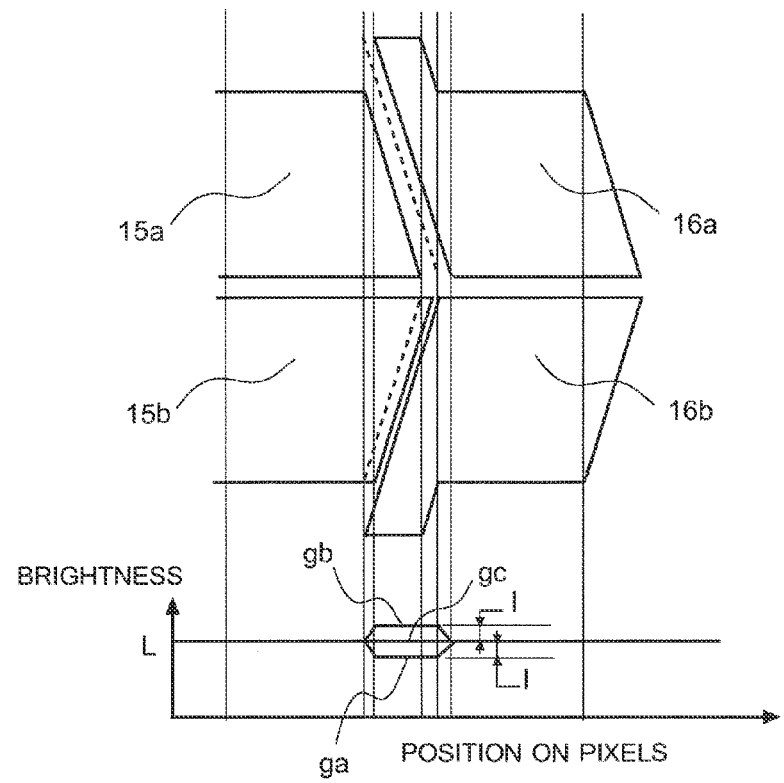
FIG. 15B is a graph showing a brightness distribution on a viewing surface of a display device of Example 2.
Figure 15C:
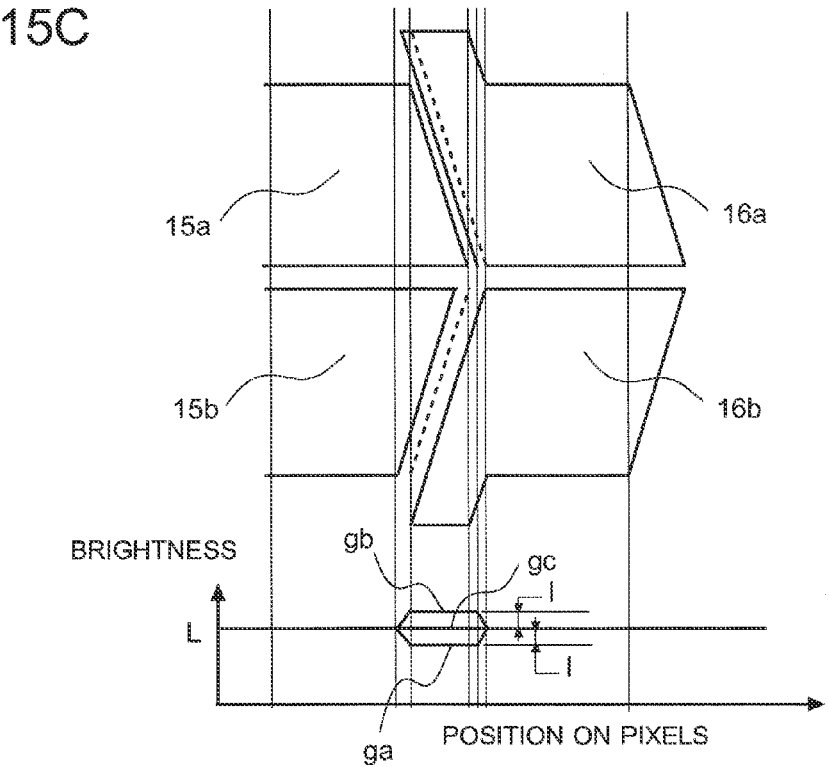
FIG. 15C is a graph showing a brightness distribution on a viewing surface of a display device of Example 2.

Next, an image display device relating to Example 2 will be described with reference to FIG. 10 to 15C. FIG. 10 is a plan view showing a structure of the first substrate of Example 2. FIG. 11 is a plan view showing a structure of a unit pixel of Example 2. FIG. 12 shows an electrical circuit diagram of a unit pixel of Example 2. Each of FIGS. 13A to 13C is a detail view showing a structure of a unit pixel of Example 2. FIG. 14 is a timing diagram showing the driving way in Example 2. Each of FIGS. 15A to 15C is a graph showing a brightness distribution on a viewing surface of a display device of Example 2. The present invention does not differ from Example 1 in the structure of a display device, a sectional view, and a structure of the optical path distribution unit, and employs those of FIGS. 1, 2 and 4.

First, the structure of Example 1 will be described with reference to the drawings.

As shown in FIG. 10, first substrate 1 is composed of components including arrayed terminal for a connection to an external device 13, first control wires 7, second control wires 8, and pixel array 12. Terminal array for a connection to an external device 13 provides a terminal for electrically connecting cable for a connection to an external device to first control wires 7, second control wires 8, and another wires which are not illustrated. First control wires 7 and second control wires 8 are the wires for transmitting control signal outputted from an external connection device which is not illustrated to pixel array 12. In pixel array 12, unit pixels 14 are arrayed in both of first direction 17 and second direction 18. In this example, there is shown a structural example wherein unit pixels 14 are arrayed such that four unit pixels are arranged along first direction 17 and five unit pixels are arranged along second direction 18, as an example. Each unit pixel 14 is composed of first viewpoint pixel 15 and second viewpoint pixel 16.

On a surface facing liquid crystal layer 5 of first substrate 1, there is arranged pixel array 12, and are arranged first control wires 7 and second control wires 8 so as to pass through pixel array 12.

There are arranged color filter 9, black matrix 10 and common electrode 11 on a surface facing liquid crystal layer 5 of second substrate 2. Color filter 9 has a function to transmit light which has passed through liquid crystal layer 5 with limiting the spectrum of the light into an arbitrary spectral region, and has various color elements arranged along second direction 18. Black matrix 10 has a function to avoid the neighboring color elements of color filter 9 from being mixed together, and to avoid light coming from an external light source which is not illustrated from leaking the inside. Common electrode 11 is used for applying electric signal to liquid crystal layer 5, and is preferably formed of a material which has both of high transmittance and highly electrically conductivity because common electrode 11 is required to transmit light emitted from an external light source which is not illustrated.

There is arranged optical path distribution unit 3 is arranged the surface of the second substrate 2 opposite from liquid crystal layer 5.

As shown in FIG. 11, one of first-viewpoint pixel 15 and for second-viewpoint pixel 16 is composed of components including first control wires 7, second control wires 8, storage capacitance lines 21, contact hole for pixel electrode 22, pixel electrode 23, storage capacitance 24 and control element 25. First control wire 7 is a wire for transmitting control signal for bringing control element 25 into an activated state or a deactivated state. Second control wire 8 is a wire for transmitting image signal to be applied to liquid crystal layer 5. Storage capacitance 24 includes storage capacitance line 21 and an electrode electrically connected to control element 25 which face each other with an insulating film put between them, to have a function to maintain the electric potential of the image signal for a certain period. Contact hole for a pixel electrode 22 is arranged for electrically connecting control element 25 to pixel electrode 23. Pixel electrode 23 is arranged for applying electrical potential difference between the electrical potential of inputted image signal and the electrical potential of common electrode 11, to liquid crystal layer 5. Similarly to common electrode 11, pixel electrode 23 is preferably formed of a material which has both of high transmittance and highly electrically conductivity.

FIG. 12 is a diagram representing the structure of FIG. 11 by using symbols of an electrical circuit. That is, each of control elements 25a and 25b is represented as one transistor. Each of storage capacitances 24a and 24b is represented as one condenser. While each of pixel electrodes 23a and 23b is paired with un-illustrated common electrode 11 to form a condenser, common electrode 11 is at a fixed electric potential and only pixel electrodes 23a and 23b whose electric potential varies is represented in this diagram for reasons of convenience. Gates of control elements 25a and 25b are connected to first control wires 7a and 7b, respectively. Sources (drains) of control elements 25a and 25b are connected to second control wire 8.

FIG. 13A shows a plan view at the left-hand side, illustrating unit pixels 14 under an ideal condition that first substrate 1 and second substrate 2 is joined together with no displacement completely, wherein six unit pixels 14 are arrayed in second direction 18 and shows a drawing at the right-hand side illustrating arbitrary unit pixels extracted from the plan view. Each of pixels 15b1 and 15b2 is a pixel on which color filter 9 in blue is arranged among first viewpoint pixels 15. Each of pixels 16b1 and 16b2 is a pixel on which color filter 9 in blue is arranged among second viewpoint pixels 16. Similarly, each of pixels 15r1 and 15r2 is a pixel on which color filter 9 in red is arranged among first viewpoint pixels 15. Each of pixels 16r1 and 16r2 is a pixel on which color filter 9 in red is arranged among second viewpoint pixels 16. Each of pixels 15g1 and 15g2 is a pixel on which color filter 9 in green is arranged among first viewpoint pixels 15. Each of pixels 16g1 and 16g2 is a pixel on which color filter 9 in green is arranged among second viewpoint pixels 16. Black matrix 10 in FIG. 13A shows a shape viewed from a surface, on which optical path distribution unit 3 is arranged, of second substrate 2.

As for an area between first viewpoint pixel 15r1 and second viewpoint pixel 16r1, the border between an aperture area and a light-shielding section is defined by an edge section of second control wires 8 at the side of first viewpoint pixel 15r1 (area A1 in FIG. 13A). On the other hand, the edge of the aperture area at the side of second viewpoint pixel 16r1 (area A2 in FIG. 13A) is defined by an edge section of black matrix 10.

Similarly, the border between the aperture area and the light-shielding section in area A3 in FIG. 13A is defined by an edge section of black matrix 10, and that in area A4 in FIG. 13A is defined by an edge section of second control wires 8. That in area A5 in FIG. 13A are defined by an edge section of black matrix 10, and that in area A6 in FIG. 13A are defined by an edge section of second control wire 8. That in area A7 in FIG. 13A are defined by an edge section of second control wire 8, and those in area A8 in FIG. 13A are defined by an edge section of black matrix 10.

As described above, the borders of the aperture area and the light-shielding section around the second control wire 8 are defined by the edge section of second control wire 8 or the edge section of black matrix 10. Each of the aperture area and the light-shielding section keeps a relationship that one side of the border is defined by an edge section of second control wire 8 and the other side is defined by an edge section of black matrix 10 in one unit pixel. It further has a relationship that the edge section of second control wire 8 and the edge section of black matrix 10 are reversed in the next unit pixel 14.

That is, the first substrate and the second substrate are formed such that each of the light-shielding areas includes edge sections facing each other in the first direction, where one of the edge sections is defined by one of the first aperture areas formed on the first substrate and the other of the edge sections is defined by one of the second aperture areas formed on the second substrate, under a condition that the first substrate and the second substrate are joined together with no displacement therebetween. Further, when one of the light-shielding areas in one of the unit pixels includes an edge section facing the first-viewpoint pixel and an edge section facing the second-viewpoint pixel, where the edge section facing the first-viewpoint pixel is defined by one of the first aperture areas and the edge section facing the second-viewpoint pixel is defined by one of the second aperture areas, one of the light-shielding areas in the next unit pixel neighboring in at least one of the first direction and the second direction, includes an edge section facing the first-viewpoint pixel and an edge section facing the second-viewpoint pixel, where the edge section facing the first-viewpoint pixel is defined by one of the second aperture areas and the edge section facing the second-viewpoint pixel is defined by one of the first aperture areas.

In other words, the first substrate and the second substrate are formed such that an aperture area of one of the first-viewpoint pixel and the second-viewpoint pixel includes at least two edge sections facing in the first direction and both of the two edge sections are defined by one of the first aperture areas and the second aperture areas, under a condition that the first substrate and the second substrate are joined together with no displacement therebetween. Further, an aperture area of the other of the first-viewpoint pixel and the second-viewpoint pixel in the next unit pixel neighboring in at least one of the first direction and the second direction includes at least two edge sections facing in the first direction, where one of the two edge sections is defined by the one of the first aperture areas and the second aperture areas.

As for cylindrical lenses 19 constructing optical path distribution unit 3 is arranged as shown in FIG. 13A, one of cylindrical lenses 19 is arranged for a column of unit pixels 14. Employing this structure enables light emitted from pixel for first viewpoint pixels 15r1, 15r2 and light emitted from second viewpoint pixels 16r1, 16r2 to be distributed into different directions through cylindrical lens 19.

FIG. 13B shows a plan view of unit pixel 14 under the situation that first substrate 1 is fixed and second substrate 2 is joined to first substrate 1 with being displaced to the left in first direction 17 by length X in the structure of FIG. 13A.

In areas A1 and A2 in FIG. 13B, the right-edge section of black matrix 10 (A2) exists at a position which is shifted to the right by length X, which enlarges the light-shielding section and deteriorates the brightness in comparison with the situation that there is no displacement. In areas A3 and A4 in FIG. 13B, the left-edge section of black matrix 10 (A3) exists at a position which is shifted to the right by length X, which makes the light-shielding section small and enhances the brightness in comparison with the situation that there is no displacement. In areas A5 and A6 in FIG. 13B, the left-edge section of black matrix 10 (A5) exists at a position which is shifted to right by length X, which makes the light-shielding section small and enhances the brightness in comparison with the situation that there is no displacement. In areas A7 and A8 in FIG. 13B, the right-edge section of black matrix 10 (A8) exists at a position which is shifted to right by length X, which enlarges the light-shielding section and deteriorates the brightness in comparison with the situation that there is no displacement.

FIG. 13C shows a plan view of unit pixel 14 under the situation that first substrate 1 is fixed and second substrate 2 is joined to first substrate 1 with being displaced to the left in first direction 17 by length X in the structure of FIG. 13A.

In areas A1 and A2 in FIG. 13C, the right-edge section of black matrix 10 (A2) exists at a position which is shifted to the left by length X, which makes the light-shielding section small and makes the area bright in comparison with the situation that there is no displacement. In areas A3 and A4 in FIG. 13C, the left-edge section of Hack matrix 10 (A3) exists at a position which is shifted to the left by length X which enlarges the light-shielding section and makes the areas dark in comparison with the situation that there is no displacement. In areas A5 and A6 in FIG. 13C, the left-edge section of black matrix 10 (A5) exists at a position which is shifted to the left by length X, which enlarges the light-shielding section and makes the areas dark in comparison with the situation that there is no displacement. In areas A7 and A8 in FIG. 13C, the right-edge section of black matrix 10 (A8) exists at a position which is shifted to the left by length X, which makes the light-shielding section small and makes the areas bright in comparison with the situation that there is no displacement.

Next, operations of Example 2 will be concretely described with reference to the drawings.

First, the driving way of the structural example of FIG. 11 will be described with reference to FIGS. 12 and 14.

At time t1, second control wire 8 starts changing to carry image-signal voltage (Vd1) to be applied to control element 25a to which first control wire 7a is connected through a gate. At that time, both of first control wires 7a and 7b are at electric potential Vgoff which brings control element 25 into a deactivated condition.

At time t2, first control wire 7a changes to carry electric potential Vgon which can bring control element 25a into an activated condition. Thereby, control element 25a is brought into an activated condition and supplies image signal Vd1 to pixel electrode 23a and storage capacity 24a through second control wires 8.

At time t3, first control wire 7a changes to carry electric potential Vgoff, which brings control element 25a into a deactivated condition.

At time t4, second control wire 8 starts changing to carry image-signal voltage (Vd2) to be applied to control element 25b to which first control wire 7h is connected through a gate. At that time, both of first control wires 7a and 7b are at electric potential Vgoff which brings control element 25 into a deactivated condition.

At time t5, first control wire 7b changes to be at electric potential Vgon. Thereby, control element 25b is brought into an activated condition and supplies image signal Vd2 to pixel electrode 23b and storage capacity 24h through second control wires 8.

At time t6, first control wire 7b changes to carry electric potential Vgoff, which brings control element 25h into a deactivated condition.

As described above, when image-signal voltage is applied to pixel electrode 23, liquid crystal layer 5 which is put between pixel electrode 23 and control electrode 11 is controlled to have transmittance corresponding to the image-signal voltage, which allows adjustment of light from the external light source.

Next, brightness distribution at the viewing position of first-viewpoint pixel 15 and second viewpoint pixel 16 will be described with reference to FIGS. 15A to 15C.

FIG. 15A shows line ga representing the brightness distribution on both of first-viewpoint pixel 15r1 and second-viewpoint pixel 16r1 of FIG. 13A, line gb representing the brightness distribution on both of first-viewpoint pixel 15r2 and second-viewpoint pixel 16r2 of FIG. 13A, and line gc representing the composition of brightness distribution of line ga and brightness distribution of line gb, with the horizontal axis for the viewing position and the vertical axis for brightness distribution.

Both of lines ga and gb show the distribution keeping almost the constant brightness L at every viewing positions and fit each other on the same graph area. Similarly, line gc fits to lines ga and gb.

Next, FIG. 15B shows line ga representing the brightness distribution on both of first-viewpoint pixel 15r1 and second-viewpoint pixel 16r1 of FIG. 13B, line gb representing the brightness distribution on both of first-viewpoint pixel 15r2 and second-viewpoint pixel 16r2 of FIG. 13B, and line gc representing the composition of brightness distribution of graph ga and brightness distribution of line gb, with the horizontal axis for the viewing position and the vertical axis for brightness distribution.

Because FIG. 15B shows the condition that second substrate 2 is displaced from first substrate 1 to the right along first direction 17, the edge portion of black matrix 10 of second substrate 2 moves in the right direction in FIG. 13B. Therefore, aperture area is narrowed by the area of A1 (that is, light-shielding section is widened). As the result, as shown by line ga, the brightness is deteriorated by the amount of 1. As for first viewpoint pixel 15r2 and second viewpoint pixel 16r2, black matrix 10 on second substrate 2 moves to the right-hand side of FIG. 13B and aperture area is widened. As the result, as shown by line gb, the brightness is enhanced by the amount of 1. Accordingly, the upper unit pixel and the lower unit pixel supplement with each other, and thereby, line gc shows the almost constant brightness L similarly to FIG. 15A.

Next, FIG. 15C shows line ga representing the brightness distribution on both of first-viewpoint pixel 15r1 and second-viewpoint pixel 16r1 of FIG. 13C, line gb representing the brightness distribution on both of first-viewpoint pixel 15r2 and second-viewpoint pixel 16r2 of FIG. 13C, and line gc representing the composition of brightness distribution of graph La and brightness distribution of line Lb, with the horizontal axis for the viewing position and the vertical axis for brightness distribution.

Because FIG. 15C shows the condition that second substrate 2 is displaced from first substrate 1 to the left along first direction 17, the edge portion of black matrix 10 of second substrate 2 moves in the left direction in FIG. 13C. Therefore, aperture area is widened by the area of A2 (that is, light-shielding section is narrowed). As the result, as shown by line ga, the brightness is enhanced by the amount of 1. As for first viewpoint pixel 15r2 and second viewpoint pixel 16r2, black matrix 10 on second substrate 2 moves to the left direction in FIG. 13C and aperture area is narrowed. As the result, as shown by line gb, the brightness is deteriorated by the amount of 1. Accordingly, the upper unit pixel and the lower unit pixel supplement with each other, and thereby, line gc shows the almost constant brightness L similarly to FIG. 15A.

In other words, when second substrate 2 is arranged with being displaced, that when the displacement between the joined substrates is caused, pixels of the present example are capable of keeping the almost same brightness similarly to the ideal condition wherein there is no displacement and are capable of avoiding deterioration of image quality coming from fluctuation of the brightness.

As described above, according to Example 2, pixels for color filters of the same color are distant from each other in comparison with the situation of Example 1, because there are pixels for color filters of different colors between the pixels for color filters of the same color. However, the difference in distance is extremely small in observers' macroscopic viewing. Therefore, the supplementary relationship between pixels for color filers of the same color can provides the same effect to that of Example 1.

Example 3

Figure 16:
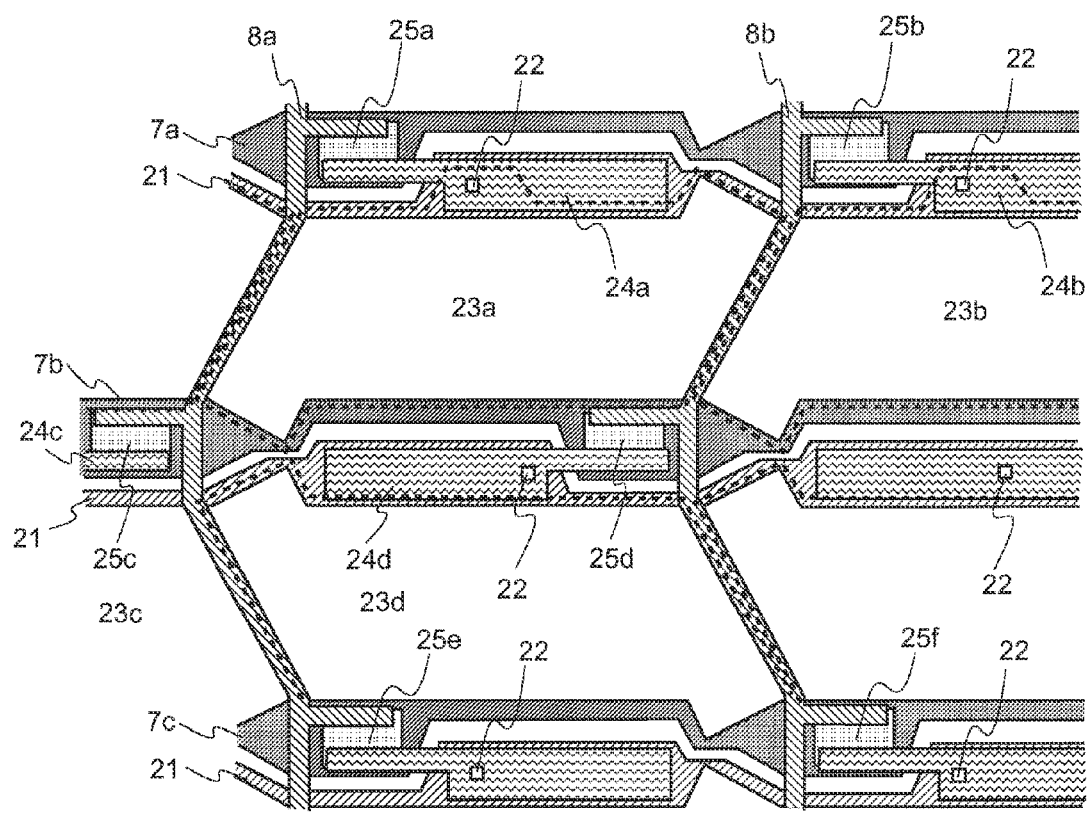
FIG. 16 is a plan view showing a structure of a unit pixel of Example 3.
Figure 17:
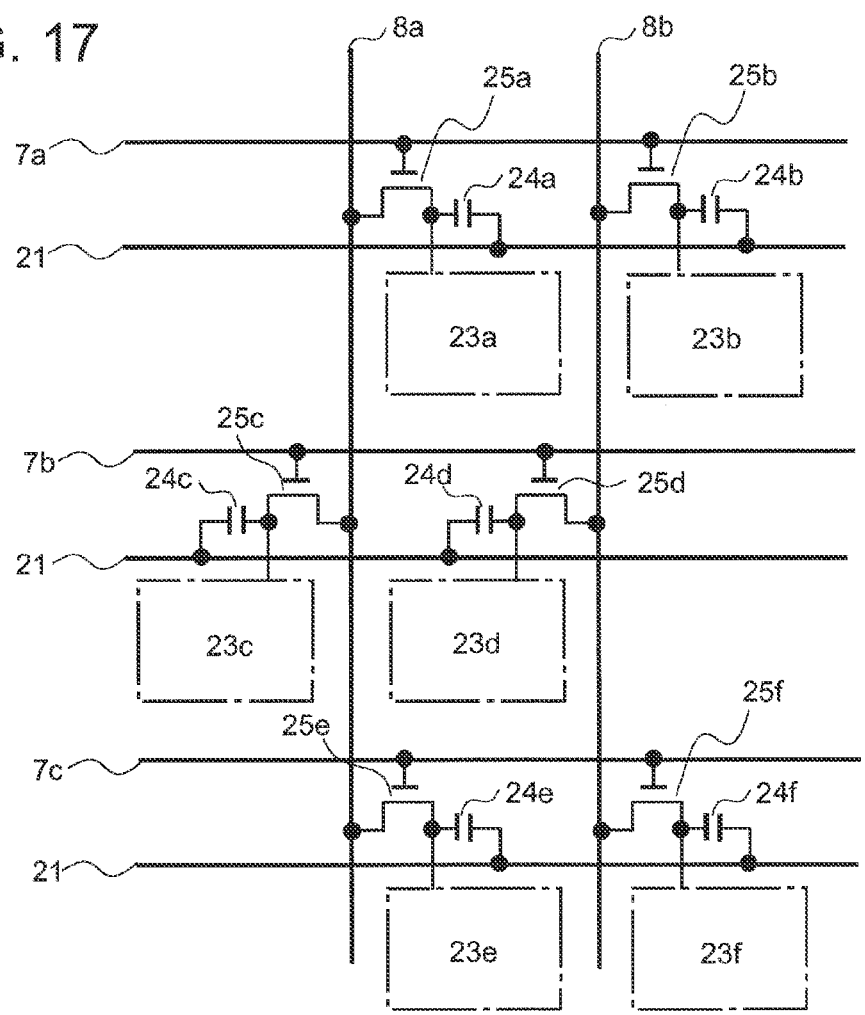
FIG. 17 shows an electrical circuit diagram of a unit pixel of Example 3.
Figure 18:
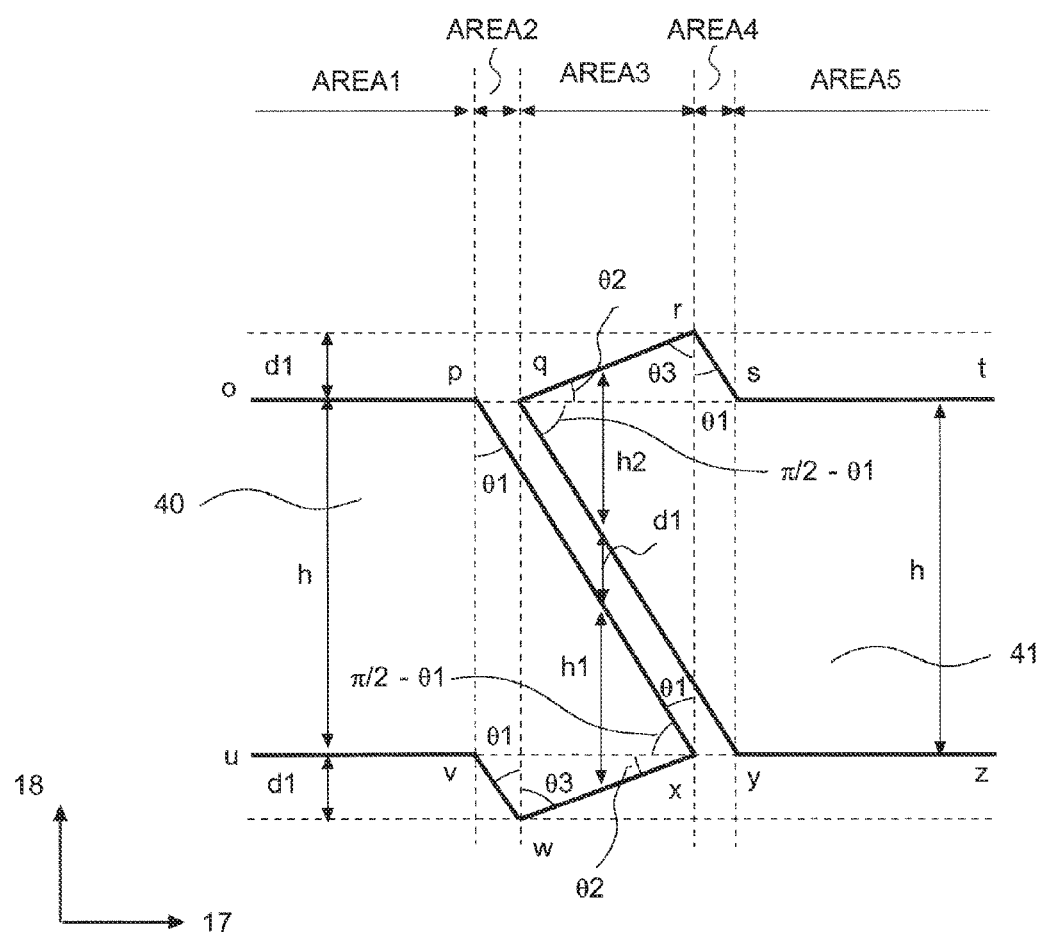
FIG. 18 is a plan view showing a structure of aperture areas of a unit pixel of Example 3.
Figure 19A:
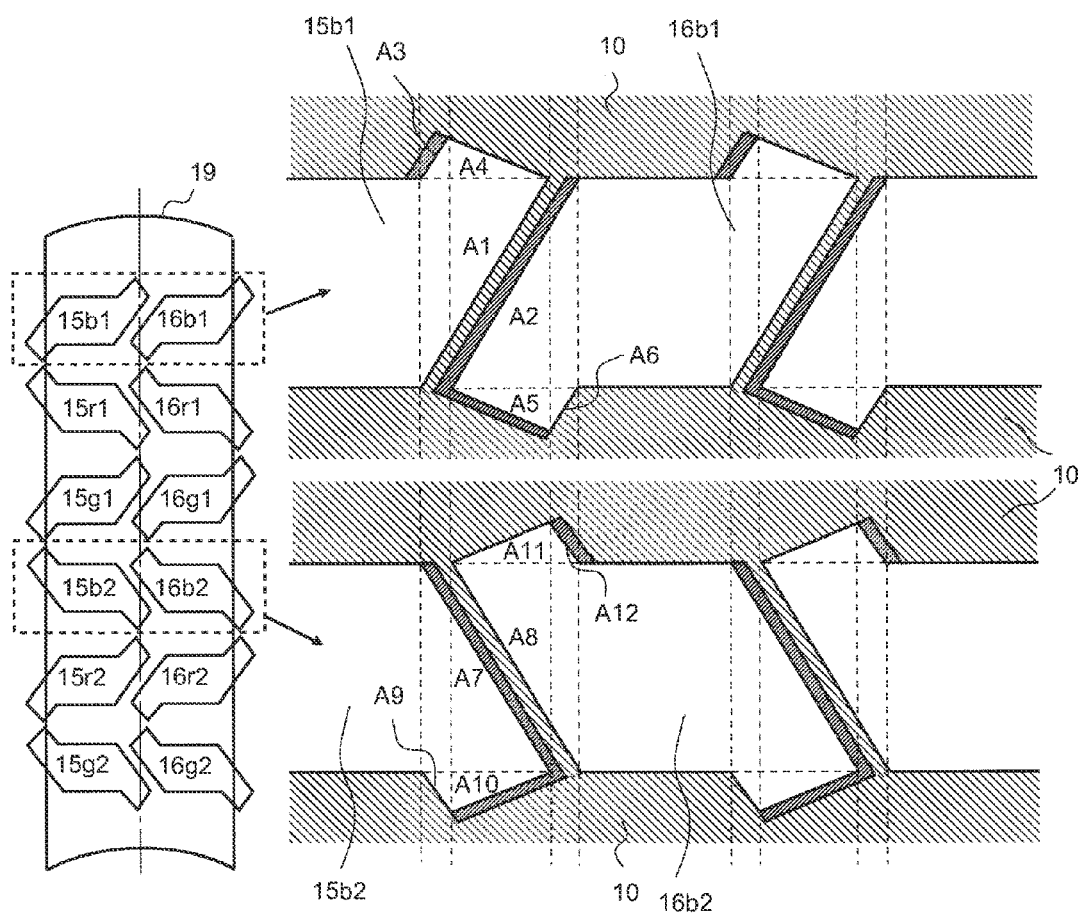
FIG. 19A is a detail view showing a structure of a unit pixel of Example 3.
Figure 19B:
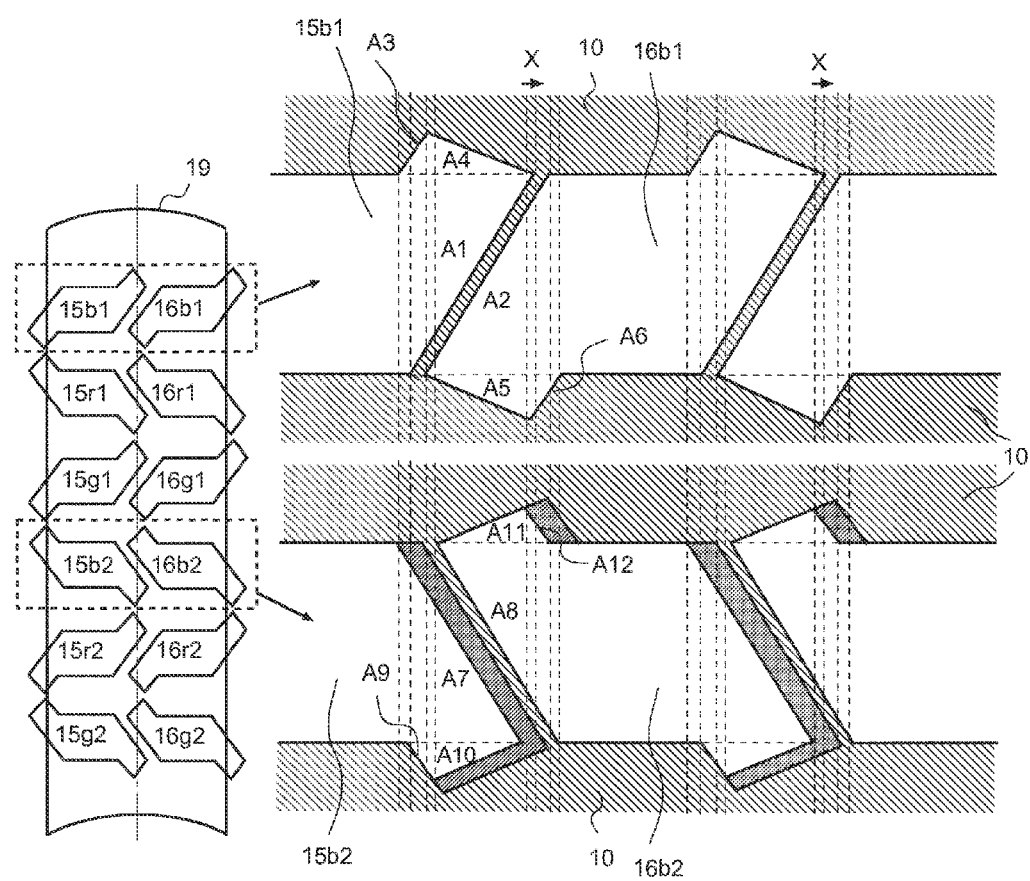
FIG. 19B is a detail view showing a structure of a unit pixel of Example 3.
Figure 19C:
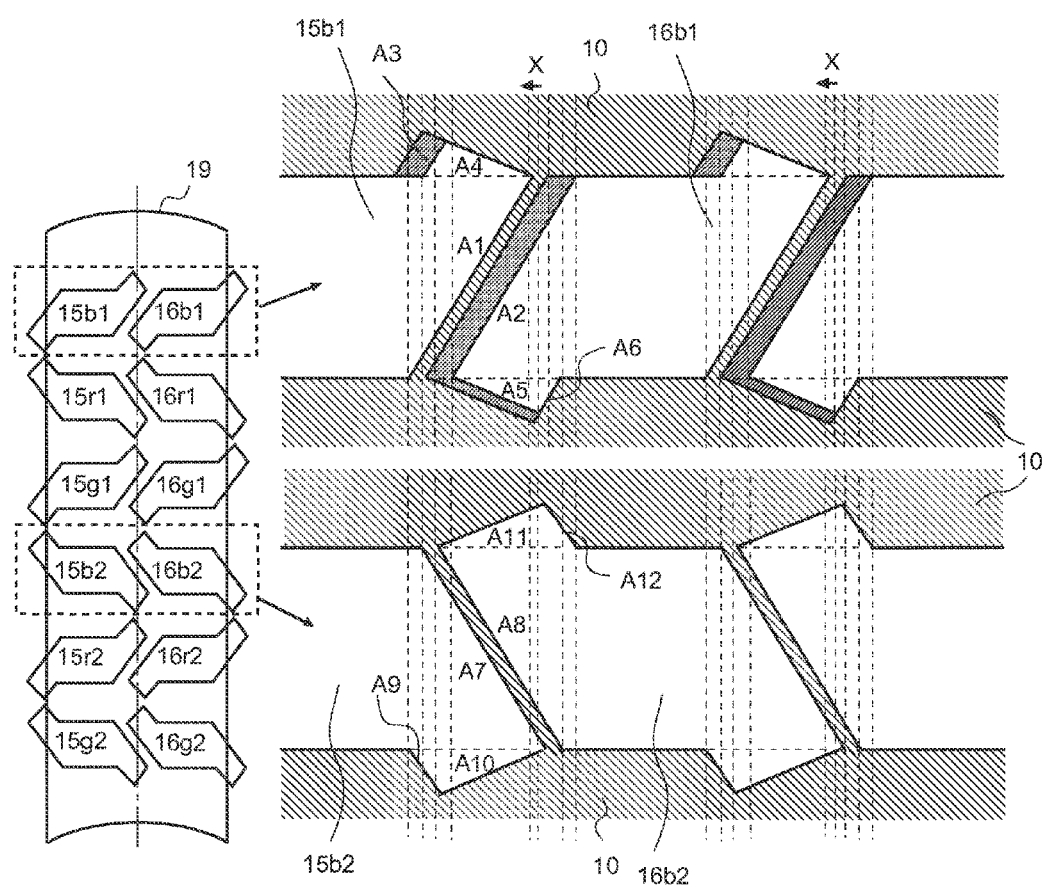
FIG. 19C is a detail view showing a structure of a unit pixel of Example 3.
Figure 20:
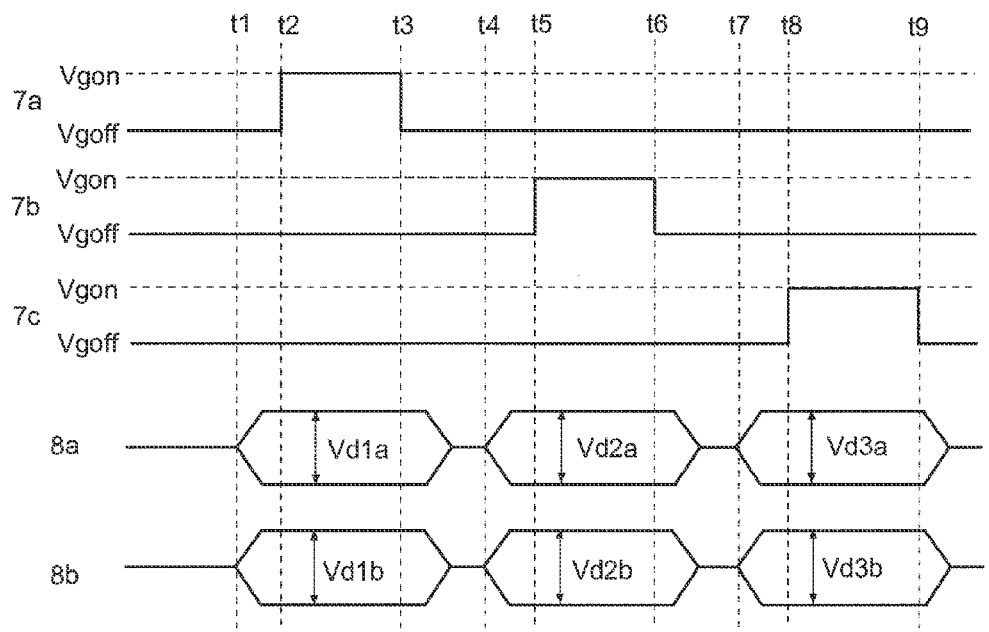
FIG. 20 is a timing diagram showing the driving way in Example 3.
Figure 21A:
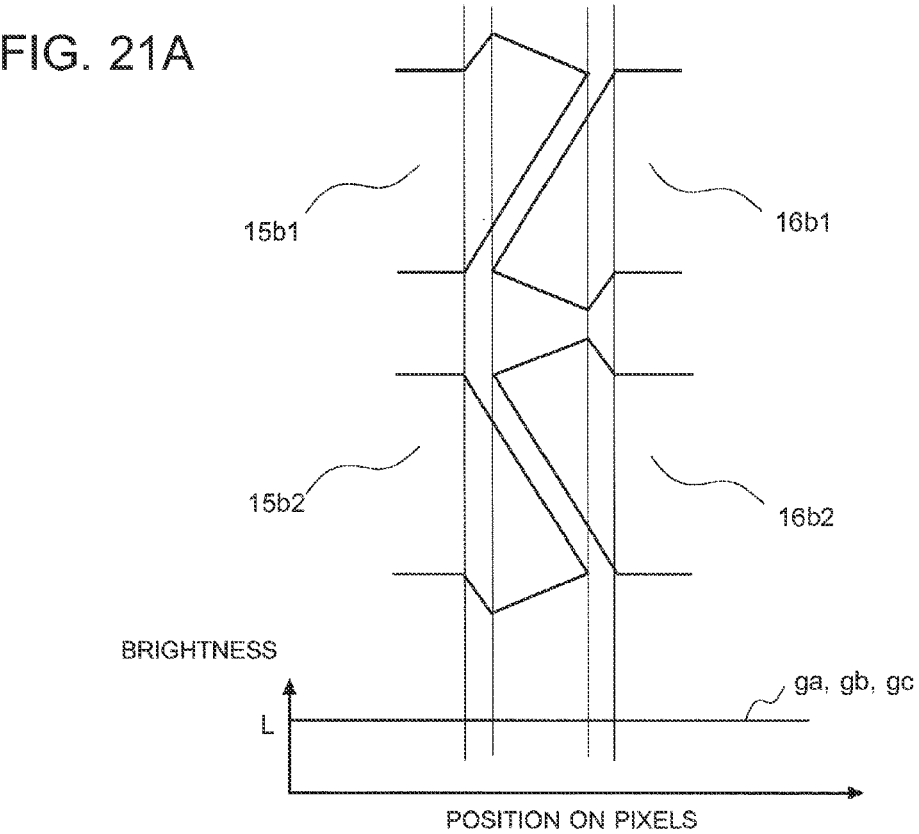
FIG. 21A is a graph showing a distribution of brightness on a viewing surface of a display device of Example 3.
Figure 21B:
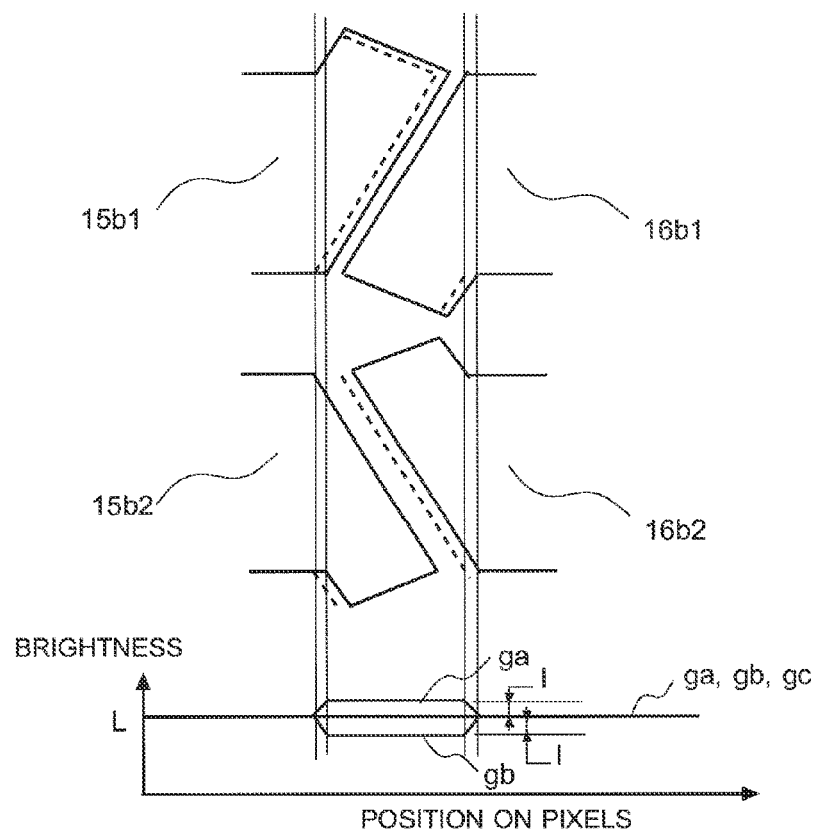
FIG. 21B is a graph showing a brightness distribution on a viewing surface of a display device of Example 3.
Figure 21C:
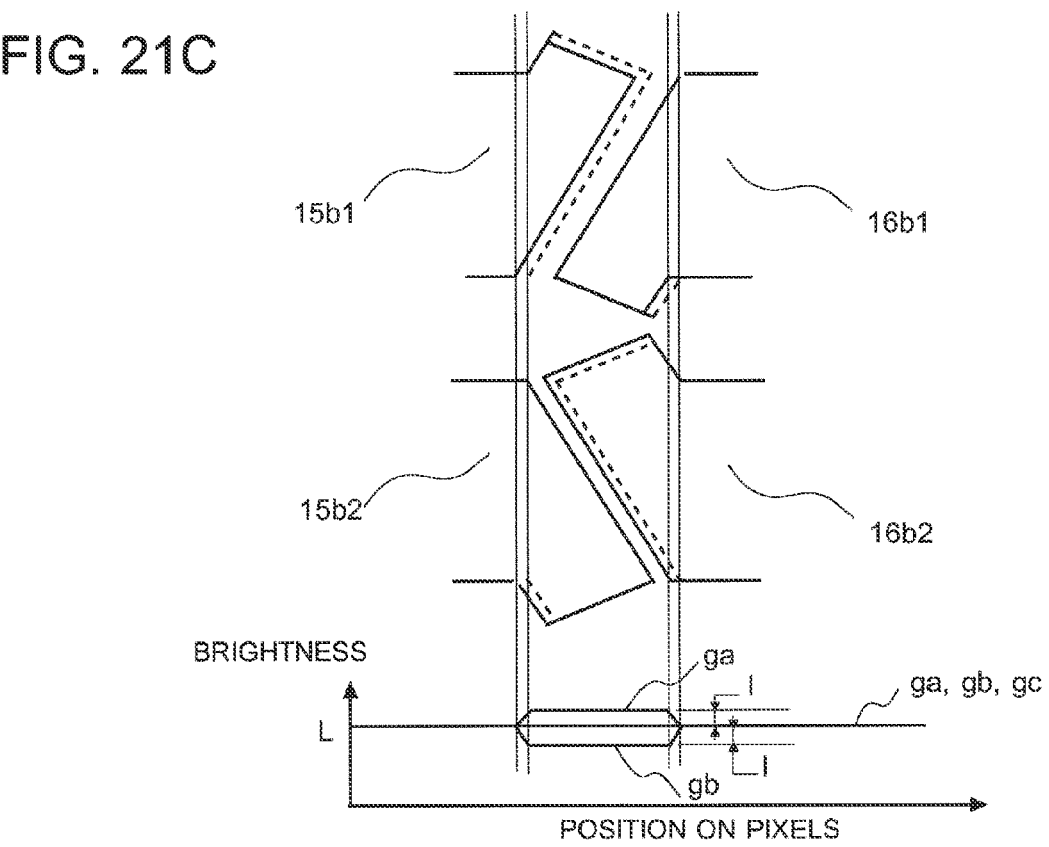
FIG. 21C is a graph showing a brightness distribution on a viewing surface of a display device of Example 3.

Next, an image display device relating to Example 3 will be described with reference to FIGS. 16 to 21C. FIG. 16 is a plan view showing a structure of the first substrate in Example 3. FIG. 17 shows an electrical circuit diagram of a unit pixel in Example 3. FIG. 18 is a plan view showing a structure of a unit pixel in Example 3. Each of FIGS. 19A to 19C is a detail view showing a structure of a unit pixel in Example 3. FIG. 20 is a timing diagram showing the driving way in Example 3. Each of FIGS. 21A to 21C is a graph showing a distribution of brightness on a viewing surface of a display device of Example 3.

As shown in FIG. 16, a pixel of the present example is composed of components including first control wires 7a to 7c, second control wires 8a, 8b, storage capacity wire 21, contact hole for pixel electrodes 22, pixel electrodes 23a to 23d, storage capacities 24a to 24d and control elements 25a to 25f.

First control wires 7a to 7c are wires provided for transmitting control signal for changing control elements 25a to 25f into an activated condition or a deactivated condition. Second control wires 8a, 8b are wires provided for transmitting image signal for applying voltage to liquid crystal layer 5. Storage capacities 24a to 24d face electrodes electrically connected to storage capacity wire 21 and control elements 25a to 25f with an insulator film put between them, to have the function to keep the electric potential of image signal for a certain period. Contact hole 22 for pixel electrodes 22 is arranged in order to electrically connect control elements 25a to 25f with pixel electrodes 23a to 23d. Pixel electrodes 23a to 23d are arranged in order to apply potential difference of electric potential of inputted image signal and electric potential of common electrode 11 to liquid crystal layer 5. Similarly to common electrode 11, pixel electrodes 23a to 23d are preferably made of material having both of high transmittance and highly electrically conductivity.

FIG. 17 is a diagram representing the structure of FIG. 16 by using symbols of an electrical circuit. That is, each of control elements 25a to 25f is represented as one transistor. Each of storage capacitances 24a to 24f is represented as one condenser. While each of pixel electrodes 23a to 23f is paired with un-illustrated common electrode 11 to form a condenser, common electrode 11 is at a fixed electric potential and only pixel electrodes 23a to 23f whose electric potential vary is represented in this diagram for reasons of convenience. Gates of control elements 25a and 25b are connected to first control wire 7a. Sources (drains) of control elements 25a and 25b are connected to second control wires 8a and 8b, respectively. Similarly, gates of control elements 25c and 25d and gates of control elements 25e and 25f are connected to first control wires 7b and 7c, respectively.

Aperture areas of pixels of the present example will be described by using FIG. 18. FIG. 18 shows aperture areas of two pixels. It is assumed that the left aperture area is first aperture area 40, which is defined by an area surrounded by points o-p-x-w-v-u. On the other hand, it is assumed that the right aperture area is second aperture area 41, which is defined by an area surrounded by points t-s-r-q-y-z. Straight line v-w, straight line p-x, straight line q-y, and straight line r-s are parallel with each other. Straight line q-r and straight line w-x are parallel with each other. Straight line o-p and straight line u-v are parallel with each other. Straight line 54 and straight line y-z are parallel with each other. Symbol h represents the length along the second direction 18 of the area surrounded by points o-p-v-u in first aperture area 40, or the length along the second direction 18 of the area surrounded by points t-s-y-z in second aperture area 41. Symbol h1 represents the length along the second direction 18 of the area surrounded by points p-x-w-v in first aperture area 40. Symbol h2 represents the length along the second direction 18 of the area surrounded by points s-r-q-y in second aperture area 41. Symbol d1 represents the distance along second direction 18 between line segment p-x and line segment q-y. Symbol d1 also represents the distance along second direction 18 between line u-z and point w, and represents the distance along second direction 18 between line o-t and point r.

In an area between line p-v and line q-w, extending along first direction 17 (AREA2 in FIG. 18), line v-w and line p-x are parallel with each other. Therefore, length h1 in this area is equal to length h. In an area between line s-y and line r-x, extending along first direction 17 (AREA4 in FIG. 18), line r-s and line q-y are parallel with each other. Therefore, length 112 in this area is equal to length h.

In an area between line q-w and line r-x, extending along first direction 17 (AREA3 in FIG. 18), line q-r and line w-x are parallel with each other, line q-y and line p-x are parallel with each other, and distance d1 keeps a constant value. Therefore, the value of (h1+h2) keeps a constant value. Under the situation, h=1 holds at a position where length h2 has a value of zero (on line q-w), and h2=h holds at a position where length h1 has a value of zero (on line r-x), which establishes the following relationship of h, h1, and h2.

$$h = h1 + h2 \quad (1)$$

Therefore, light passing through the aperture areas has the almost same brightness at various positions along first direction 17. That is, this structure exhibits the same effect as that of pixels of Example 1 shown in FIG. 5 and that of pixels of Example 2 shown in FIG. 11.

Herein, angle θ1 represents an angle formed between line p-x (or line q-y) and second direction 18. Angle θ2 represents an angle formed between line w-x (or line r-q) and first direction 17. Angle θ3 represents an angle formed between line w-x (or line r-q) and second direction 18.

Each of angles θ2 and θ3 is defined as the following expression by using θ2, h, and d1.

$$\theta 2 = \tan^{-1}(d1/(h-d1) \times \tan \theta 1)) \quad (2)$$

$$\theta 3 = \tan^{-1}((h-d1)/d1 \times \tan \theta 1)) \quad (3)$$

The relationship of θ2 and θ3 can be expressed as the following expression from FIG. 18.

$$\theta 2 + \theta 3 = \pi/2 \quad (4)$$

The angle of the area formed by points p-x-w (or points y-q-r) in each pixel of the present example is given as $(\pi/2-\theta 1+\theta 2)$. On the other hand, the angle of the same area in each of Example 1 and Example 2 is given as $(\pi/2-\theta 1)$. When this area is formed by using only black matrix 10 of second substrate 2, the shape around point x (or point q) has a rounded corner because of a manufacturing factor and is hardly reproduced with accuracy. In other words, even under the condition that it has been designed to satisfy Expression (1), the manufactured structure has the different shape and deviates from the condition satisfying Expression (1), which makes deteriorated moiré pattern.

On the other hand, the angle of the area formed by points p-x-w (or points y-q-r) in each pixel of the present example is increased by $\theta 2$, which reduces an influence coming from the rounded corner of black matrix 10 after its manufacturing process. According to an experimentation of the present inventor, when the angle of the area formed by points p-x-w (or points y-q-r) or the angle of the area formed by points v-w-x (or points s-q-r) is fallen substantially in the range of 60° to 120°, the deterioration of the Moiré pattern coming from its manufacturing process was not observed. As an especially preferable structure, there can be cited a structure that both of the angle $(\pi/2-\theta 1+\theta 2)$ of the area formed by points p-x-w (or points y-q-r) and the angle $(\theta 1+\theta 3)$ keep the value close to 90°.

Accordingly, pixels of the present invention can provides the effect equivalent to those of Example 1 and Example 2, and can further provides the effect that deterioration of the moiré pattern coming from the manufacturing process of black matrix 10 can be avoided.

FIG. 19A shows a plan view at the left-hand side, illustrating unit pixels 14 under an ideal condition that first substrate 1 and second substrate 2 is joined together with no displacement completely, wherein six unit pixels 14 are arrayed in second direction 18 and shows a drawing at the right-hand side illustrating arbitrary unit pixels extracted from the plan view. Each of pixels 15b1 and 15b2 is a pixel on which color filter 9 in blue is arranged among first viewpoint pixels 15. Each of pixels 16b1 and 16b2 is a pixel on which color filter 9 in blue is arranged among second viewpoint pixels 16. Similarly, each of pixels 15r1 and 15r2 is a pixel on which color filter 9 in red is arranged among first viewpoint pixels 15. Each of pixels 16r1 and 16r2 is a pixel on which color filter 9 in red is arranged among second viewpoint pixels 16. Each of pixels 15g1 and 15g2 is a pixel on which color filter 9 in green is arranged among first viewpoint pixels 15. Each of pixels 16g1 and 16g2 is a pixel on which color filter 9 in green is arranged among second viewpoint pixels 16. Black matrix 10 in FIG. 19A shows a shape viewed from a surface, on which optical path distribution unit 3 is arranged, of second substrate 2.

As for an area between first viewpoint pixel 15b1 and second viewpoint pixel 16b1, the border between an aperture area and a light-shielding section is defined by an edge section of second control wires 8 at the side of first viewpoint pixel 15r1 (area A1 in FIG. 19A). On the other hand, an opening edge at the side of second viewpoint pixel 16b1 (area A2 in FIG. 19A) is defined by an edge section of black matrix 10. Further, the border between the aperture area and the light-shielding section in each of area A3 and area A5 in FIG. 19A is defined by, for example, an edge section of first control wire 7, and that in each of area A4 and area A6 in FIG. 19A is defined by an edge section of black matrix 10.

As described above, the borders of first-viewpoint pixel 15b1 and second-viewpoint pixel 16b1 are defined by the edge section of second control wire 8 or the edge section of black matrix 10. Each of first-viewpoint pixel 15b1 and second-viewpoint pixel 16b1 keeps a relationship that one side of the border is defined by an edge section of second control wire 8 and the other side is defined by an edge section of black matrix 10.

As for cylindrical lenses 19 constructing optical path distribution unit 3 is arranged as shown in FIG. 19A, one of cylindrical lenses 19 is arranged for a column of unit pixels 14. Employing this structure enables light emitted from pixel for first viewpoint pixels 15b1, 15b2 and light emitted from second viewpoint pixels 16b1, 16b2 to be distributed into different directions through cylindrical lens 19.

FIG. 19B shows a plan view of unit pixel 14 under the situation that first substrate 1 is fixed and second substrate 2 is joined to first substrate 1 with being displaced to the right in first direction 17 by length X in the structure of FIG. 19A. In areas A1 and A2 in FIG. 19B, the left-edge section of black matrix 10 (A2) exists at a position which is shifted to the right by length X, which makes the light-shielding section small and enhances the brightness in comparison with the situation that there is no displacement. In areas A7 and A8 in FIG. 19B, the right-edge section of black matrix 10 (A8) exists at a position which is shifted to right by length X, which enlarges the light-shielding section and deteriorates the brightness in comparison with the situation that there is no displacement. Each of areas A3, A5 and A12 in FIG. 19B is shielded by the edge section of first control wire 7 in the condition that there is no displacement, and the light-shielding condition does not change even when second substrate 2 is shifted to the right. On the other hand, in each of areas A4 and A6, the light-shielding section is decided by the edge section of black matrix 10, and the aperture area changes to be widened by the displacement of second substrate 2 to the right, which enhances the brightness in comparison with the situation that there is no displacement. In each of areas A9 and A10, the light-shielding section is decided by the edge section of black matrix 10, and the aperture area changes to be narrow by the displacement of second substrate 2 to the right, which deteriorates the brightness in comparison with the situation that there is no displacement.

FIG. 19C shows a plan view of unit pixel 14 under the situation that first substrate 1 is fixed and second substrate 2 is joined to first substrate 1 with being displaced to the left in first direction 17 by length X in the structure of FIG. 19A. In areas A1 and A2 in FIG. 19C, the left-edge section of black matrix 10 (A1) exists at a position which is shifted to the left by length X, which enlarges the light-shielding section and deteriorates the brightness in comparison with the situation that there is no displacement. In areas A7 and A8 in FIG. 19C, the right-edge section of black matrix 10 (A3) exists at a position which is shifted to the left by length X, which makes the light-shielding section small and enhances the brightness in comparison with the situation that there is no displacement. Each of areas A3, A5 and A12 in FIG. 19C is shielded by the edge section of first control wire 7 in the condition that there is no displacement, and the light-shielding condition does not change even when second substrate 2 is shifted to the left. On the other hand, in each of areas A4 and A6, the light-shielding section is decided by the edge section of black matrix 10, and the aperture area changes to be narrow by the displacement of second substrate 2 to the left, which deteriorate the brightness in comparison with the situation that there is no displacement. In each of areas A3 and A11, the light-shielding section is decided by the edge section of black matrix 10, and the aperture area changes to be widened by the displacement of second substrate 2 to the left, which enhances the brightness in comparison with the situation that there is no displacement.

Next, operations of Example 3 will be concretely described with reference to FIG. 20.

At time t1, second control wire 8a starts changing to carry image-signal voltage (Vd1a) to be applied to control element 25a to which first control wire 7a is connected through a gate. Further, second control wire 8b starts changing to carry image-signal voltage (Vd1b) to be applied to control element 25b. At that time, all of first control wires 7a to 7c are at electric potential Vgoff which brings control elements 25a to 25f into a deactivated condition.

At time t2, first control wire 7a changes to carry electric potential Vgon which can bring control elements 25a and 25b into an activated condition. Thereby, control elements 25a and 25b are brought into an activated condition and supply image signal Vd1a to pixel electrode 23a and storage capacity 24a through second control wires 8a and image signal Vd1b to pixel electrode 23b and storage capacity 24b through second control wires 8b.

At time t3, first control wire 7a changes to carry electric potential Vgoff, which brings control elements 25a and 25b into a deactivated condition.

At time t4, second control wire 8a starts changing to carry image-signal voltage (Vd2a) to be applied to control element 25c to which first control wire 7b is connected through a gate. Further, second control wire 8b starts changing to carry image-signal voltage (Vd2b) to be applied to control element 25b. At that time, all of first control wires 7a to 7c are at electric potential Vgoff which brings control elements 25a to 25f into a deactivated condition.

At time t5, first control wire 7b changes to carryelectric potential Vgon. Thereby, control elements 25c and 25d are brought into an activated condition and supplies image signal Vd2a to pixel electrode 23c and storage capacity 24c through second control wires 8a and image signal Vd2b to pixel electrode 23d and storage capacity 24d through second control wires 8b.

At time t6, first control wire 7b changes to carry electric potential Vgoff, which brings control elements 25c and 25d into a deactivated condition.

At time t7, second control wire 8a starts changing to carry image-signal voltage (Vd3a) to be applied to control element 25e to which first control wire 7c is connected through a gate. Further, second control wire 8b starts changing to carry image-signal voltage (Vd3b) to be applied to control element 25f. At that time, all of first control wires 7a to 7c are at electric potential Vgoff which brings control elements 25a to 25f into a deactivated condition.

At time t8, first control wire 7c changes to carry electric potential Vgon. Thereby, control elements 25e and 25f are brought into an activated condition and supplies image signal Vd3a to pixel electrode 23e and storage capacity 24e through second control wires 8a and image signal Vd3b to pixel electrode 23f and storage capacity 24f through second control wires 8b.

At time t9, first control wire 7c changes to carry electric potential Vgoff, which brings control elements 25e and 25f into a deactivated condition.

As described above, when image-signal voltage is applied to pixel electrode 23, liquid crystal layer 5 which is put between pixel electrode 23 and control electrode 11 is controlled to have transmittance corresponding to the image-signal voltage, which allows adjustment of light from the external light source.

Next, brightness distribution at the viewing position of first-viewpoint pixel and second viewpoint pixel will be described with reference to FIGS. 21A to 21C.

FIG. 21A shows line ga representing the brightness distribution on both of first-viewpoint pixel 15b1 and second-viewpoint pixel 16b1 of FIG. 19A, line gb representing the brightness distribution on both of first-viewpoint pixel 15b2 and second-viewpoint pixel 16b2 of FIG. 19A, and line gc representing the composition of brightness distribution of graph ga and brightness distribution of line gb, with the horizontal axis for the viewing position and the vertical axis for brightness distribution.

Both of lines ga and gb show the distribution keeping almost the constant brightness L at every viewing positions and fit each other on the same graph area. Similarly, line gc fits to lines ga and gb.

Next, FIG. 21B shows line ga representing the brightness distribution on both of first-viewpoint pixel 15b1 and second-viewpoint pixel 16b1 of FIG. 19B, line gb representing the brightness distribution on both of first-viewpoint pixel 15b2 and second-viewpoint pixel 16b2 of FIG. 19B, and line gc representing the composition of brightness distribution of graph ga and brightness distribution of line gb, with the horizontal axis for the viewing position and the vertical axis for brightness distribution.

Because FIG. 21B shows the condition that second substrate 2 is displaced from first substrate 1 to the right along first direction 17, the edge portion of black matrix 10 of second substrate 2 moves in the right direction in the sheet. Therefore, aperture area is widened by the area of A1 (that is, light-shielding section is narrowed). As the result, as shown by line ga, the brightness is enhanced by the amount of 1. As for first viewpoint pixel 15b2 and second viewpoint pixel 16b2, black matrix 10 on second substrate 2 moves to the right of FIG. 21B and area A8 is narrowed. As the result, as shown by line gb, the brightness is deteriorated by the amount of 1. Accordingly, the upper unit pixel and the lower unit pixel supplement with each other, and thereby, line gc shows the almost constant brightness L similarly to FIG. 21A.

Next, FIG. 21C shows line ga representing the brightness distribution on both of first-viewpoint pixel 15b1 and second-viewpoint pixel 16b1 of FIG. 19C, line gb representing the brightness distribution on both of first-viewpoint pixel 15b2 and second-viewpoint pixel 16b2 of FIG. 19C, and line gc representing the composition of brightness distribution of graph ga and brightness distribution of line gb, with the horizontal axis for the viewing position and the vertical axis for brightness distribution.

Because FIG. 21C shows the condition that second substrate 2 is displaced from first substrate 1 to the left along first direction 17, the edge portion of black matrix 10 of second substrate 2 moves in the left direction in FIG. 21C. Therefore, aperture area is narrowed by the area of A2 (that is, light-shielding section is widened). As the result, as shown by line ga, the brightness is deteriorated by the amount of 1. As for first viewpoint pixel 15b2 and second viewpoint pixel 16b2, black matrix 10 on second substrate 2 moves to the left-hand side of FIG. 21C and aperture area is widened by the area of A5 in FIG. 21C. As the result, as shown by line gb, the brightness is enhanced by the amount of 1. Accordingly, the upper unit pixel and the lower unit pixel supplement with each other, and thereby, line gc shows the almost constant brightness L similarly to FIG. 21A.

In other words, according to pixels of the example, similarly to Examples 1 and 2, when second substrate 2 is arranged with being displaced, that is, when the displacement is caused, pixels of the present example are capable of keeping the almost same brightness similarly to the ideal condition wherein there is no displacement and are capable of avoiding deterioration of image quality coming from fluctuation of the brightness.

As described above, according to the present example, under the condition that first substrate 1 and second substrate 2 are joined together with displacement because of manufacturing accuracy, distribution of brightness of aperture areas of neighboring pixels is consistent to the ideal condition that there is no displacement even when the brightness has been changed because of the change in the shape of the aperture areas coming from the displacement, which is capable of realizing an image display device which can avoid deterioration of display quality coming from the displacement.

Further, similarly to Example 2, because the light-shielding width is defined by the edge potion second control wire 8 on first substrate 1 and the edge portion of black matrix 10 on second substrate, there is no need to widen the light-shielding width, which enables to realize an image display device having pixels with a high opening-area ratio.

Further, because pixels are formed so as to have angles being almost 90° or more in Example 3, the manufacturing accuracy of black matrix 10 on second substrate 2 becomes equivalent to that of pixels used in conventional liquid crystal displays, which exhibits another effect to restrict the deterioration of a moiré pattern coming from a manufacturing factor of black matrix 10.

Example 4

Figure 22:
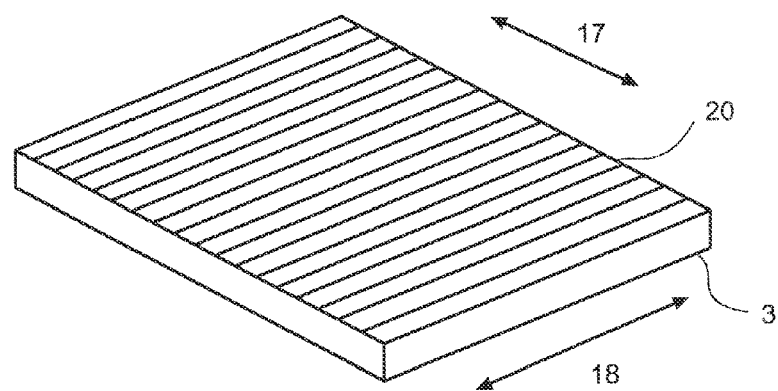
FIG. 22 is a perspective view showing an optical path distribution unit of Example 4.
Figure 23:
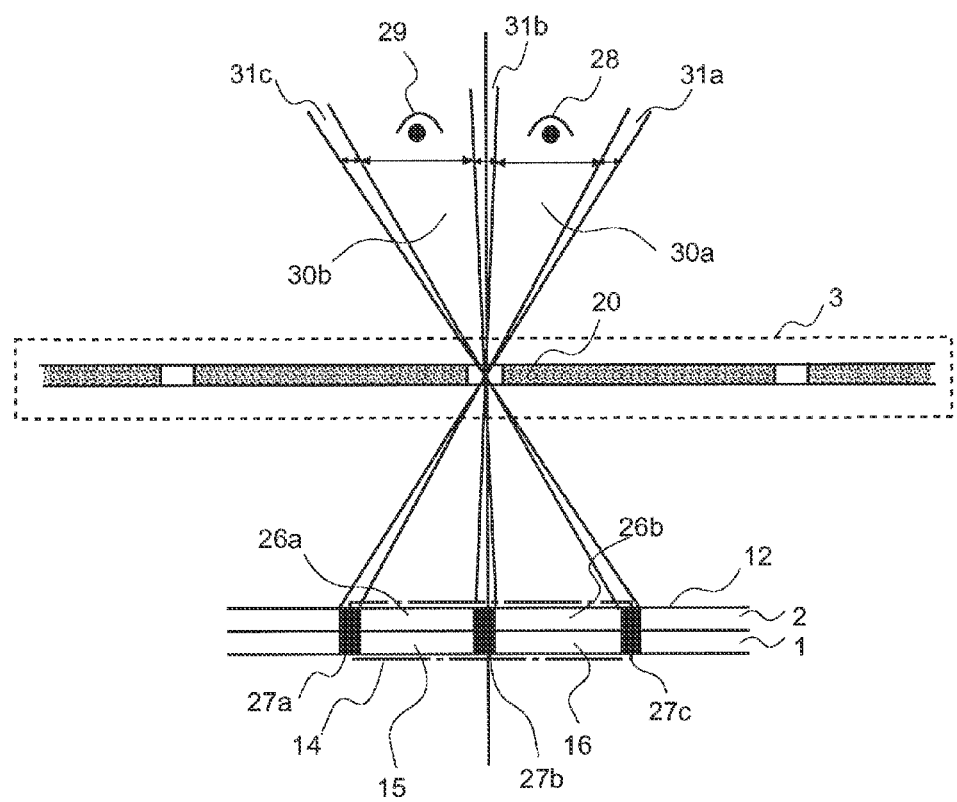
FIG. 23 is an optical model diagram of a display device and a viewer in Example 4.

Next, an image display device relating to Example 4 will be described with reference to FIGS. 22 to 23. FIG. 22 is a perspective view illustrating a structure of an optical path distribution unit of Example 4. FIG. 23 is an optical model diagram of a display device and a viewer in Example 4. Other structures of the present example are the same as those of Example 1 show in FIGS. 1 to 3 and 5 to 7C.

First, the structure of Example 4 will be concretely described with reference to the drawings.

As shown in FIG. 22, optical path distribution unit 3 of Example 4 including parallax barriers 20 whose components extends in second direction 18 are arrayed along first direction 17. On parallax barrier 20, there are formed slits in a thin-striped shape. In comparison with the cylindrical lens forming optical path distribution unit 3 of Example 1, parallax barrier 20 can be manufactured inexpensive relatively. Therefore, the image display device of Example 4 can be manufactured inexpensively in comparison with that of Example 1.

Next, the operations in Example 4 will be concretely described below with reference to the drawings. Because the structure of optical path distribution unit 3 of the present example differs from that of Example 1, the operations in the present example will be described by using FIG. 23.

As shown in FIG. 23, light, which has gone out from aperture area 26*a* of first-viewpoint pixel 15, passes through parallax barrier 20 forming optical path distribution unit 3, and thereby is emitted to form display area 30*a*. Also light which has gone out from aperture area 26*b* of second-viewpoint pixel 16 passes through parallax barrier 20, and thereby is emitted to form display area 30*b*. Under this situation, when a viewer is put at the position such that the left eye 28 is located in display area 30*a* and the right eye 29 is located in display area 30*b*, an image for the first viewpoint enters the left eye and an image for the second view point enters the right eye. The image for the first viewpoint and the image for the second viewpoint are images providing parallax for constructing a stereoscopic image. When the image for the first viewpoint has been prepared for left eye 28 and the image for the second viewpoint has been prepared for right eye 29, the viewer can perceive the stereoscopic image. On the other hand, this structure makes non-display areas 31*a*, 31*b* and 31*c* coming from light-shielding sections 27*a*, 27*b* and 27*c* on pixel array 12.

Accordingly, Example 4 can provide the effect similarly to that of Example 1 as described-above, and can realizes an inexpensive image display device.

Example 5

Figure 24:
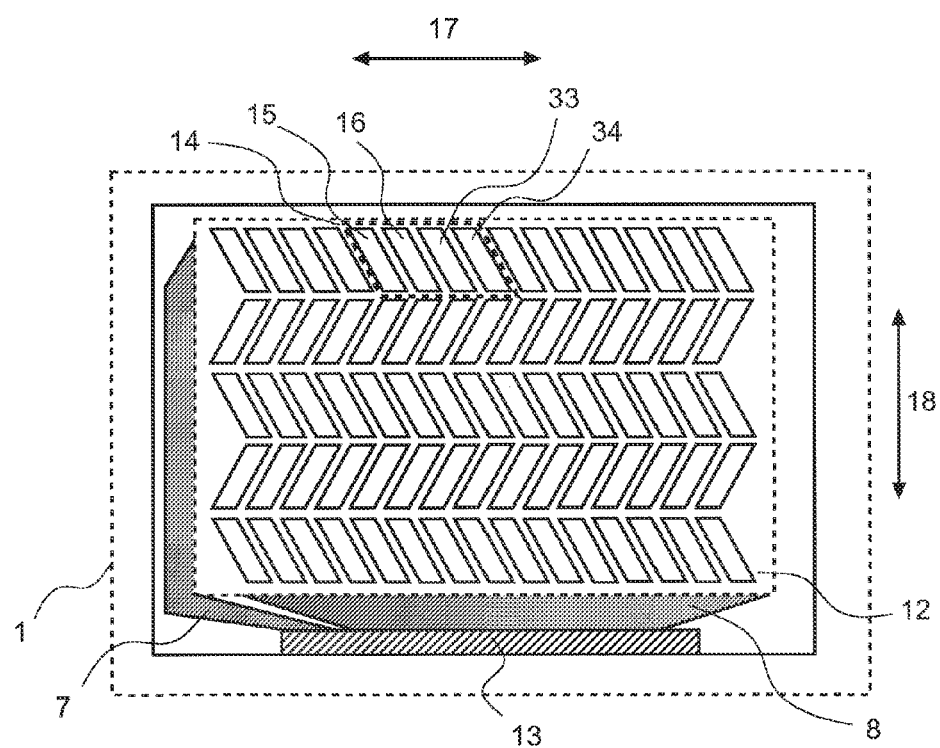
FIG. 24 is a plan view showing a structure of a first substrate in Example 5.
Figure 25A:
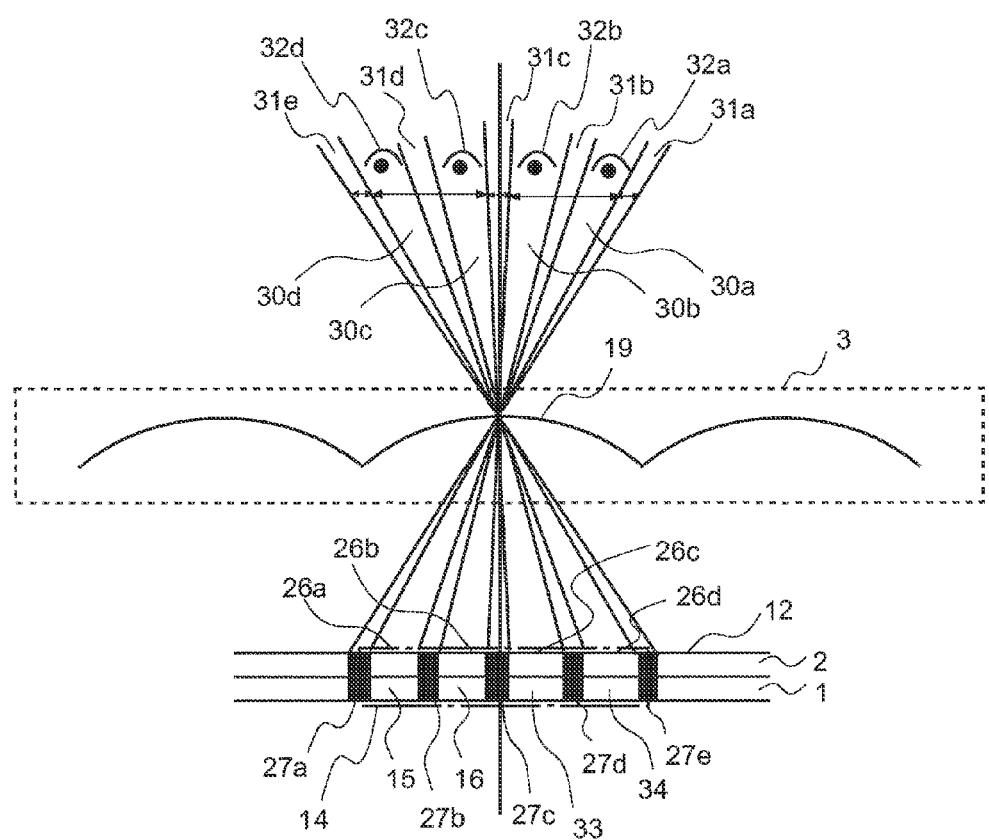
FIG. 25A is an optical model diagram of a display device and a viewer in Example 5.
Figure 25B:
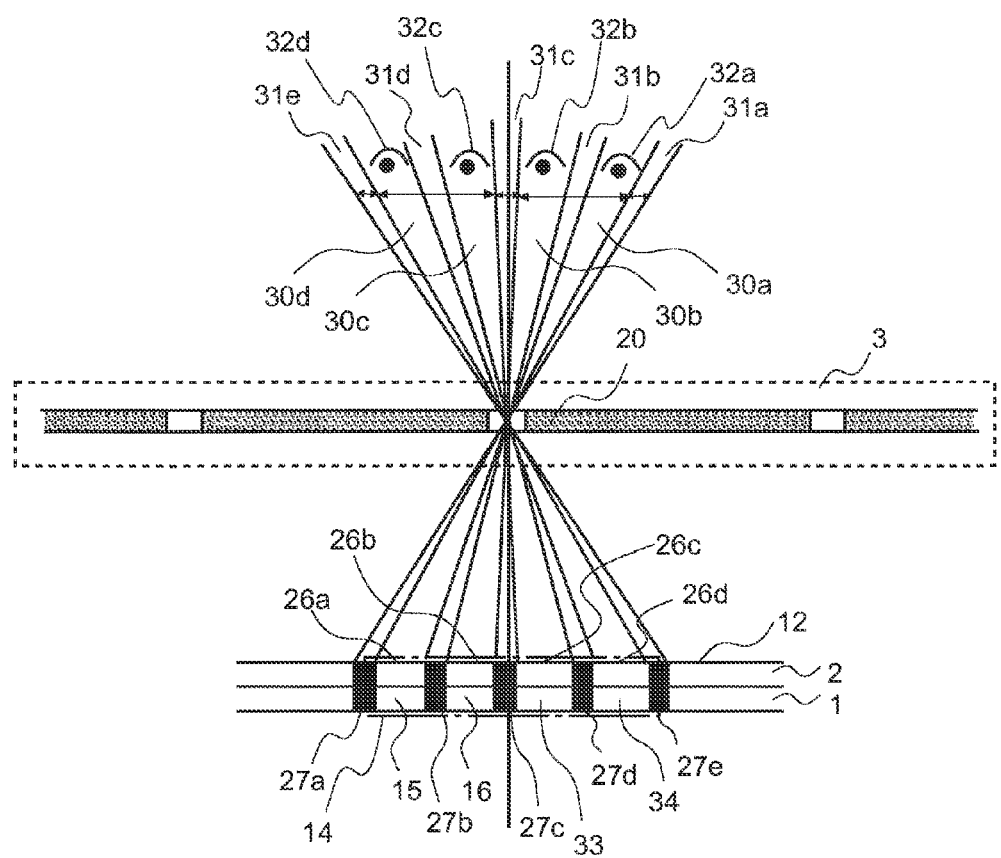
FIG. 25B is an optical model diagram of a display device and a viewer in Example 5.
Figure 26:
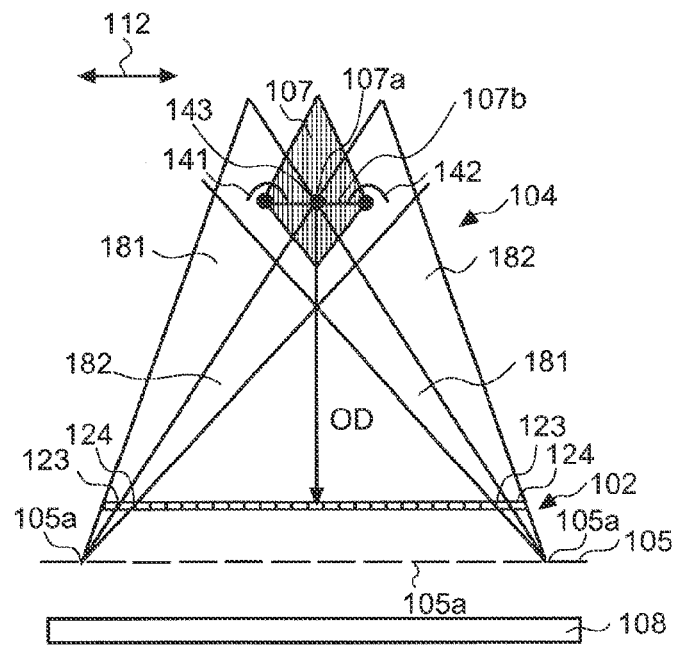
FIG. 26 is an optical model diagram showing a stereoscopic image display method using a conventional parallax barrier method.
Figure 27:
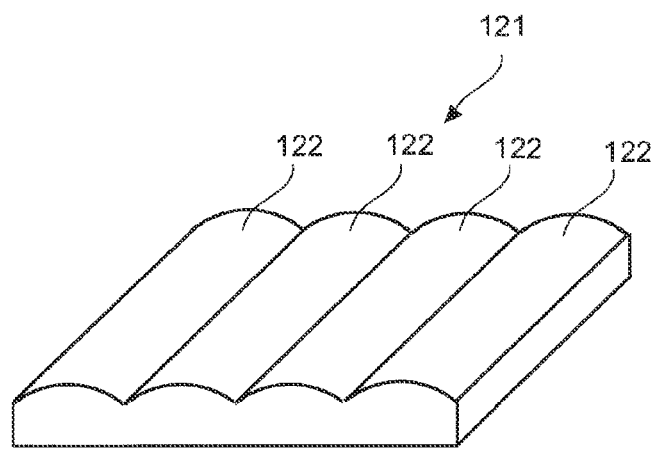
FIG. 27 is a perspective view showing a conventional lenticular lens.
Figure 28:
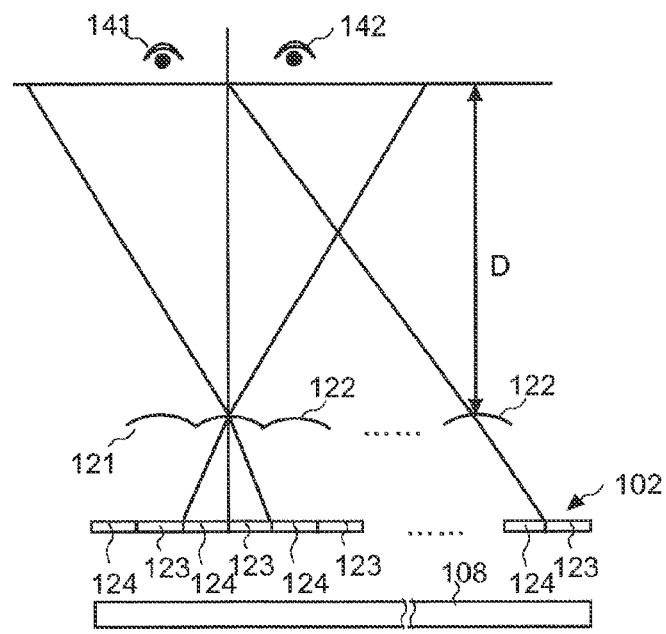
FIG. 28 is an optical model diagram showing the way of stereoscopic displaying using a conventional lenticular lens method.
Figure 29:
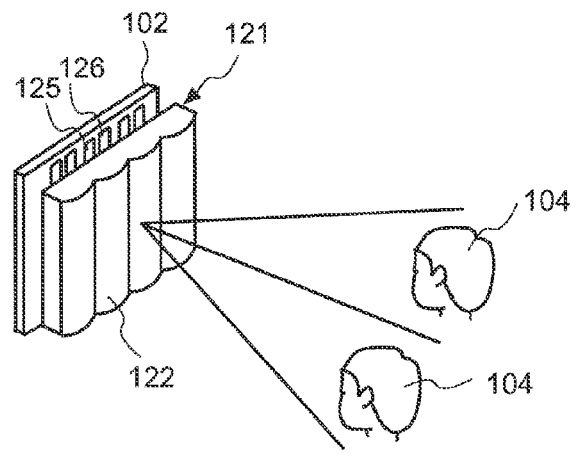
FIG. 29 is a perspective view showing a stereoscopic display device employing a conventional lenticular lens method.
Figure 30A:
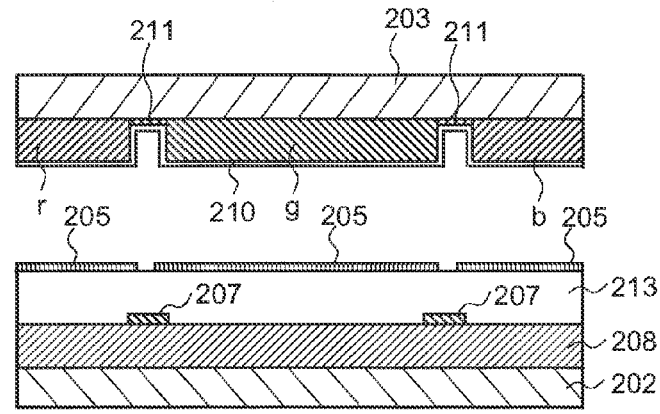
FIG. 30A is a sectional view showing a sectional structure of a conventional art.
Figure 30B:
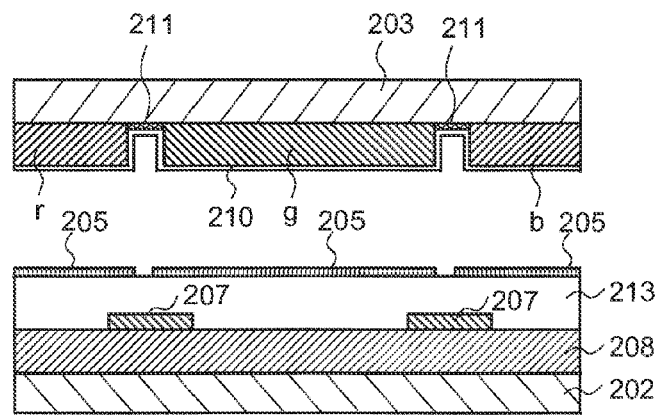
FIG. 30B is a sectional view showing an example of a sectional structure based on the conventional art.
Figure 30C:
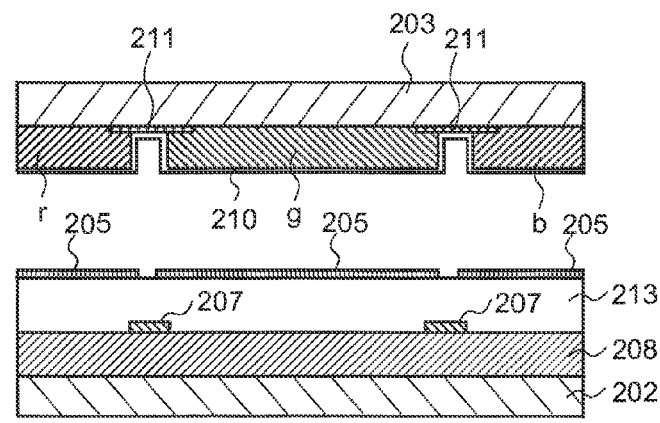
FIG. 30C is a sectional view showing an example of a sectional structure based on the conventional art.
Figure 31A:
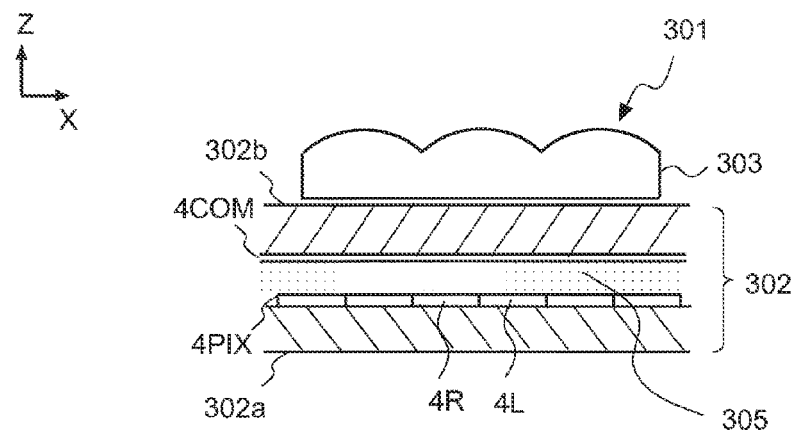
FIG. 31A is a sectional view showing a sectional structure of anther conventional art.
Figure 31B:
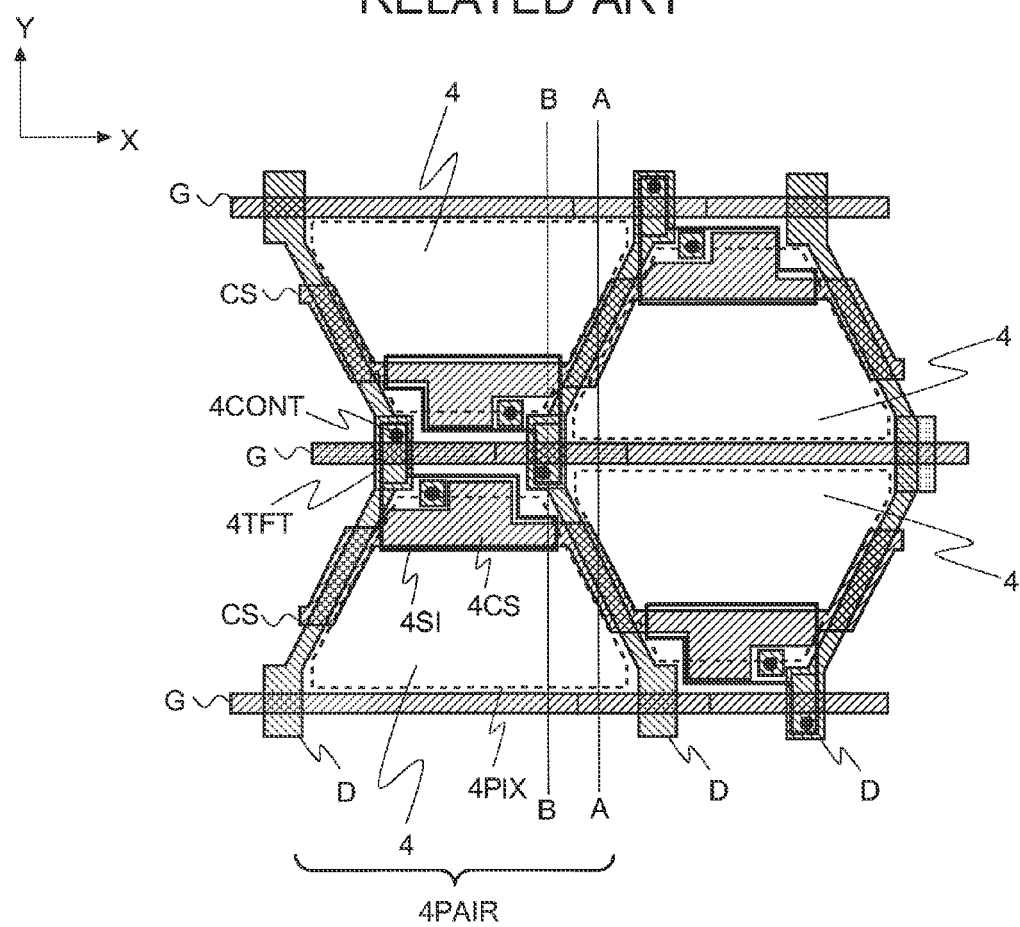
FIG. 31B is a plan view showing a structure of pixels of anther conventional art.
Figure 32A:
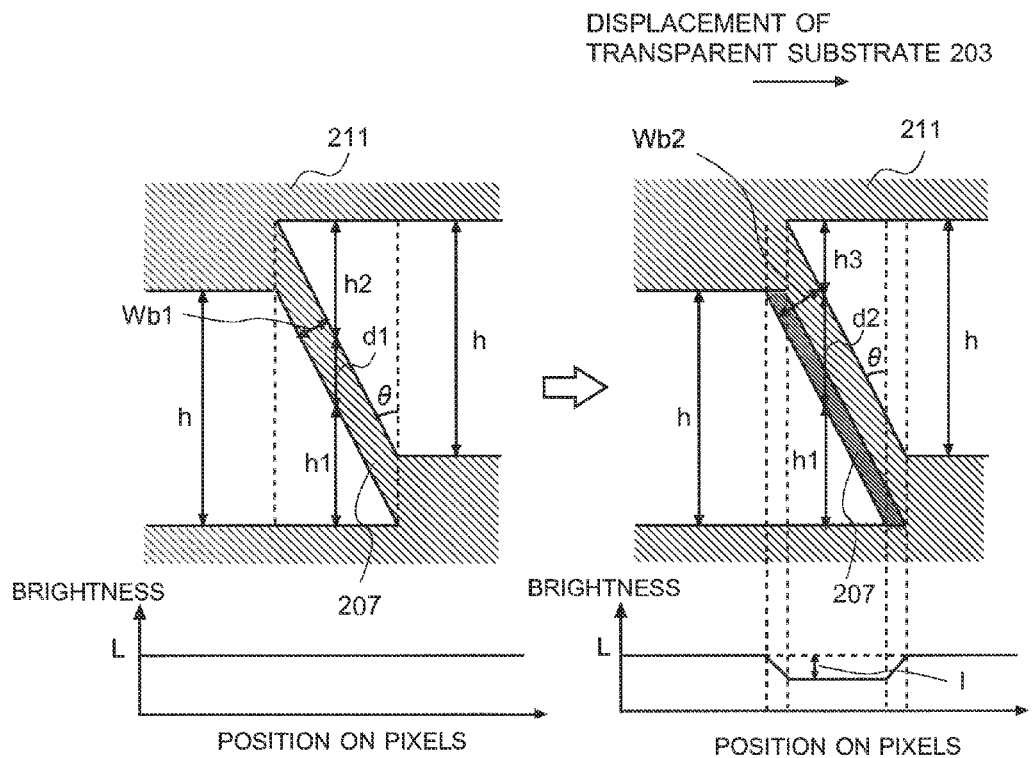
FIG. 32A is a diagram illustrating a problem of a conventional structure.
Figure 32B:
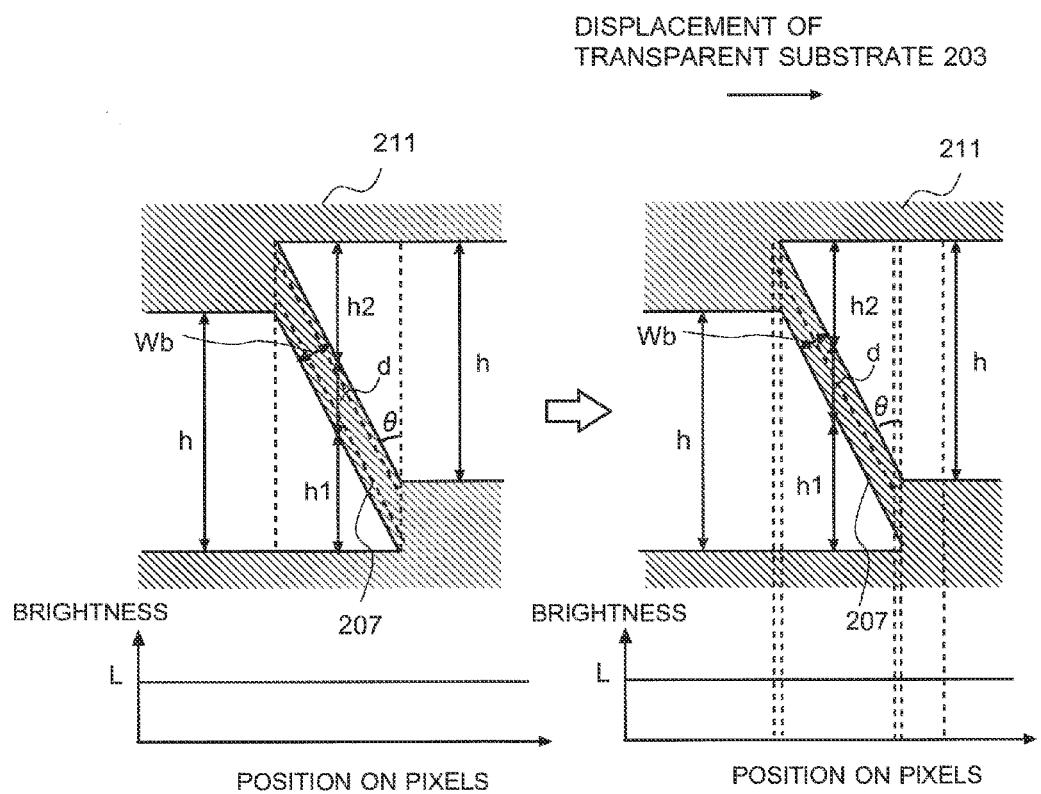
FIG. 32B is a diagram illustrating a problem of a conventional structure.
Figure 32C:
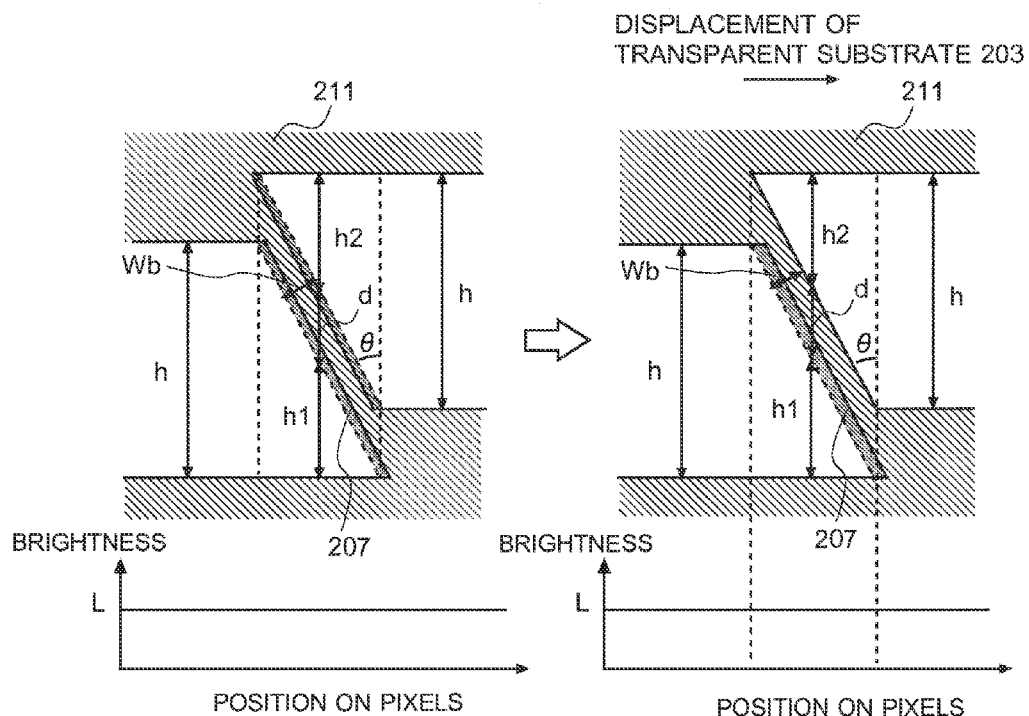
FIG. 32C is a diagram illustrating a problem of a conventional structure.
Figure 33:
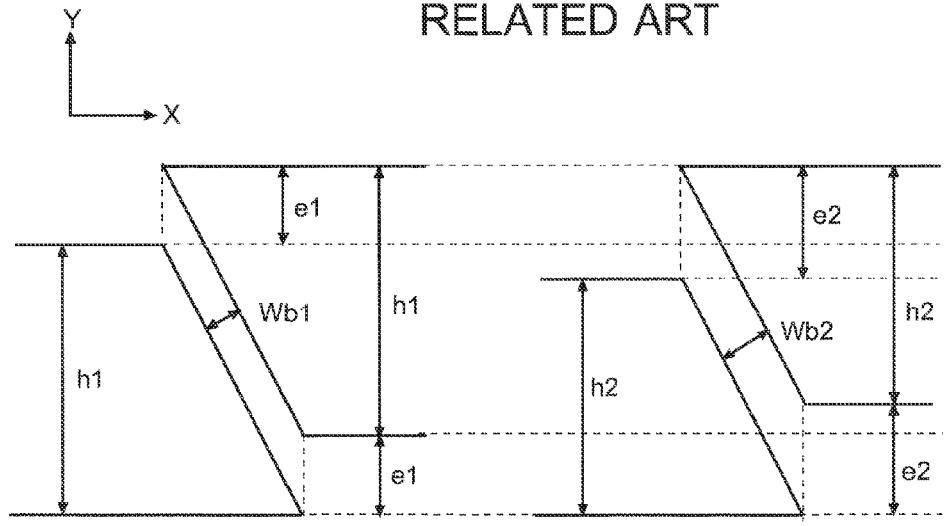
FIG. 33 is a diagram illustrating a problem caused when a light-shielding width is large.

Next, an image display device relating to Example 5 will be described with reference to FIGS. 24, 25A and 25B. FIG. 24 is a plan view illustrating a structure of the first substrate of Example 5. Each of FIGS. 25A and 25B is an optical model diagram of a display device and a viewer in Example 5. Other structures of the present example are the same as those of Example 1 show in FIGS. 1 to 3 and 5 to 7C.

Above-described Examples 1 to 3 show stereoscopic display devices with two view-points using first-viewpoint pixels 15 and second-viewpoint pixels 16. On the other hand, the present example is aimed at realizing a so-called multi-viewpoint stereoscopic display device. Herein, a structure of a four-viewpoint stereoscopic display device will be described as an example.

Because the present example differs from Example 1 in the structure of first substrate 1, the structure of first substrate 1 of Example 5 will be described with reference to FIG. 24.

As shown in FIG. 24, first substrate 1 of Example 5 is different from Example 1 in the points that unit pixel 14 is composed of first-viewpoint pixels 15, second-viewpoint pixels 16, third-viewpoint pixels 33, fourth-viewpoint pixels 34. The present example shows a four-viewpoint stereoscopic display device as an example of multi-viewpoint display device, and there are arranged four pixels for providing display for four viewpoints in unit pixel 14. As for optical path distribution unit 3 of the present example, the structure shown in FIG. 4 may by employed, or the structure shown in FIG. 22 may by employed.

Next, the operations of Example 5 will be concretely described with reference to the drawings.

Though the present example shows a structure that unit pixel 14 is composed of four pixels as shown in FIG. 24, the difference in viewpoint of electrical circuit is only the doubled number of pixels. Therefore, the driving method shown in FIG. 14 can be applied to the present example. The present invention is aimed at realizing four-viewpoint stereoscopic display device, and FIGS. 25A and 25B show the way that a ray of light emitted from pixel array 12 travels through optical path distribution unit 3 to the eyes of a viewer.

FIG. 25A shows an example that the structure shown in FIG. 4 is employed as optical path distribution unit 3. Light, which has gone out from aperture area 26*a* of first-viewpoint pixel 15, passes through cylindrical lens 19 forming optical path distribution unit 3, and thereby is emitted to form display area 30*a*. Also light which has gone out from aperture area 26*b* of second-viewpoint pixel 16 passes through cylindrical lens 19, and thereby is emitted to form display area 30*b*. At the same time, light which has gone out from aperture area of third-viewpoint pixel 33, is emitted to form display area 30*c* and light which has gone out from aperture area 26b of fourth-viewpoint pixel 34 passes through cylindrical lens 19, and thereby is emitted to form display area 30d. Under this situation, when a viewer is put at the position such that the eyes of the viewer are located in two neighboring display areas among display areas 30a to 30d, the viewer can perceive a stereoscopic image. On the other hand, this structure makes non-display areas 31a to 31d coming from light-shielding sections 27a to 27e on pixel array 12.

FIG. 25B shows an example that the structure shown in FIG. 22 is employed as optical path distribution unit 3. Light, which has gone out from aperture area 26a of first-viewpoint pixel 15, passes through parallax barrier 20 forming optical-path distribution unit 3, and thereby is emitted to form display area 30a. Also light which has gone out from aperture area 26b of second-viewpoint pixel 16 passes through cylindrical lens 19, and thereby is emitted to form display area 30b. At the same time, light which has gone out from aperture area of third-viewpoint pixel 33, is emitted to form display area 30c and light which has gone out from aperture area 26h of fourth-viewpoint pixel 34 passes through parallax barrier 20, and thereby is emitted to form display area 30d. Under this situation, when a viewer is put at the position such that the eyes of the viewer are located in two neighboring display areas among display areas 30a to 30d, the viewer can perceive a stereoscopic image. On the other hand, this structure makes non-display areas 31a to 31d coming from light-shielding sections 27a to 27e on pixel array 12.

As described above, Example 5 can provide the effect similar to that of Example 1, and realizes a stereoscopic display device which can handles images for multi-viewpoint displaying. Further, because the images for multi-viewpoint displaying provide less displacement between different viewpoints than those for two viewpoints, viewers can perceive stereoscopic images in a more-closely natural state.

While the present example of the present invention have been described using specific terms, such description is for illustrative purpose only, and it is to be understood that changes and variations may be made without depending from the spirit or scope of the appended claims.

For example, each of the above examples describes the situation that second control wires 8 and black matrix 10 modify the forms of light-shielding sections between pixels. However, the present invention can be applied to the situation that another objects located so as to be able to light-shielding members modify the forms of light-shielding sections between pixels.

Further, each of the above examples describes the situation that first substrate 1 and second substrate 2 are joined with displacement in first direction 17 because of accuracy in the manufacturing process. However, the present invention can be applied also to the situation that the situation that first substrate 1 and second substrate 2 are joined with displacement in second direction 18 because of accuracy in the manufacturing process.

The present invention is applicable to an image display device, especially to an image display device by which a stereoscopic image can be perceived.

The invention claimed is:
1. An image display device comprising:
a first substrate on which first aperture areas are formed;
a second substrate on which second aperture areas are formed;
an optical element arranged between the first substrate and the second substrate;
a plurality of unit pixels arranged in a matrix in which the plurality of the unit pixels are arrayed in a first direction and a second direction perpendicular to the first direction, each of the unit pixels including a first-viewpoint pixel for displaying an image for a first viewpoint and a second-viewpoint pixel for displaying an image for a second viewpoint, the first-viewpoint pixel and the second-viewpoint pixel being arranged alternately along the first direction; and
an optical path distribution unit arranged on the second substrate,
wherein each of the first-viewpoint pixel and the second-viewpoint pixel includes the first substrate, the second substrate, and the optical element arranged between the first substrate and the second substrate,
wherein incident light on each of the first-viewpoint pixel and the second-viewpoint pixel passes through one of the first aperture areas on the first substrate, is emitted from one of the second aperture areas on the second substrate, and is distributed in different directions by the optical path distribution unit, the first aperture areas and the second aperture areas facing each other along a direction in which the incident light passes,
wherein each of the unit pixels further includes a light-shielding area in which the incident light on each of the first-viewpoint pixel and the second-viewpoint pixel does not pass through either the first substrate or the second substrate,
wherein the plurality of unit pixels includes:
a plurality of first unit pixels each having the light shielding area which is arranged between the first-viewpoint pixel and the second-viewpoint pixel and includes an edge section facing the first-viewpoint pixel and an edge section facing the second-viewpoint pixel, the edge section facing the first-viewpoint pixel being defined by a border between a control wire disposed at the first substrate and one of the first aperture areas, the edge section facing the second-viewpoint pixel being defined by a border between a black matrix disposed on the second substrate and one of the second aperture areas under a condition that the first substrate and the second substrate are aligned without displacement in the first direction, and the edge section facing the first-viewpoint pixel and the edge section facing the second-viewpoint pixel being parallel; and
a plurality of second unit pixels, which are adjacent to the plurality of the first unit pixels in the second direction, each having the light-shielding area which is arranged between the first-viewpoint pixel and the second-viewpoint pixel and includes an edge section facing the first-viewpoint pixel and an edge section facing the second-viewpoint pixel, the edge section facing the first-viewpoint pixel being defined by the border between the black matrix disposed on the second substrate and one of the second aperture areas, the edge section facing the second-viewpoint pixel being defined by the border between the control wire disposed at the first substrate and one of the first aperture areas under the condition that the first substrate and the second substrate are aligned without displacement in the first direction, and the edge section facing the first-viewpoint pixel and the edge section facing the second-viewpoint pixel being parallel, and
wherein each of the light-shielding areas includes a region overlapping with the first aperture area and the second aperture area in a direction of the incident light.

2. The image display device of claim 1, wherein the optical path distribution unit includes a cylindrical lens.

3. The image display device of claim 1, wherein the optical path distribution unit includes a parallax barrier.

* * * * *